(12) United States Patent
Moore

(10) Patent No.: US 12,330,902 B2
(45) Date of Patent: Jun. 17, 2025

(54) PACKING SYSTEM FOR HEAT SET

(71) Applicant: SHAW INDUSTRIES GROUP, INC., Dalton, GA (US)

(72) Inventor: Wesley Moore, Rock Springs, GA (US)

(73) Assignee: Shaw Industries Group, Inc., Dalton, GA (US)

( * ) Notice: Subject to any disclaimer, the term of this patent is extended or adjusted under 35 U.S.C. 154(b) by 0 days.

(21) Appl. No.: 18/724,116

(22) PCT Filed: Nov. 1, 2023

(86) PCT No.: PCT/US2023/078390
§ 371 (c)(1),
(2) Date: Jun. 25, 2024

(87) PCT Pub. No.: WO2024/097782
PCT Pub. Date: May 10, 2024

(65) Prior Publication Data
US 2025/0058993 A1 Feb. 20, 2025

Related U.S. Application Data

(60) Provisional application No. 63/478,780, filed on Jan. 6, 2023, provisional application No. 63/381,838, filed on Nov. 1, 2022.

(51) Int. Cl.
*B65H 54/26* (2006.01)
*B65G 61/00* (2006.01)
(Continued)

(52) U.S. Cl.
CPC ............ *B65H 54/26* (2013.01); *B65G 61/00* (2013.01); *B65H 65/005* (2013.01); *B65H 67/066* (2013.01); *B65H 2701/31* (2013.01)

(58) Field of Classification Search
CPC .................. B65H 54/26; B65G 61/00
See application file for complete search history.

(56) References Cited

U.S. PATENT DOCUMENTS

| 5,066,190 A | 11/1991 | D'Agnolo |
| 5,096,245 A | 3/1992 | Kikuchi et al. |

(Continued)

FOREIGN PATENT DOCUMENTS

| CN | 113771057 A | * 12/2021 |
| EP | 0396012 A2 | 11/1990 |
| EP | 0644422 A1 | * 8/1994 |

OTHER PUBLICATIONS

PCT International Search Report and Written Opinion for PCT/US23/78390, dated Mar. 28, 2024.

*Primary Examiner* — Daniel Jeremy Leeds
(74) *Attorney, Agent, or Firm* — Ballard Spahr LLP

(57) ABSTRACT

A system has at least one winder configured to wind yarn to form a yarn package. At least one sampling and tying machine is configured to remove a portion of the yarn of the yarn package and tie off a free end of the yarn around the yarn package to inhibit the yarn package from unwinding. A dunnage supply area has therein at least one support structure for receiving a plurality of yarn packages thereon. A robotic arm is configured to: move the yarn package from the at least one winder to the at least one sampling and tying machine; move the yarn package from the at least one sampling and tying machine to at least one case assembly area; and stack the yarn package on a support structure in the at least one case assembly area.

23 Claims, 18 Drawing Sheets

(51) Int. Cl.
*B65H 65/00* (2006.01)
*B65H 67/06* (2006.01)

(56) References Cited

U.S. PATENT DOCUMENTS

| | | | |
|---|---|---|---|
| 2021/0006205 A1 | 1/2021 | Tanaka et al. | |
| 2021/0130123 A1* | 5/2021 | Kurtz | B66F 9/063 |
| 2021/0404094 A1* | 12/2021 | Zhang | D01H 9/001 |

* cited by examiner

PACKING SYSTEM FOR HEAT SET

CROSS-REFERENCE TO RELATED APPLICATIONS

This is a U.S. National Phase Application of International Application No. PCT/US2023/78390, filed Nov. 1, 2023, which claims priority to and the benefit of the filing dates of U.S. Provisional Patent Application No. 63/381,838, filed Nov. 1, 2022, and U.S. Provisional Patent Application No. 63/478,780 filed Jan. 6, 2023, the entirety of each of which is hereby incorporated by reference herein.

FIELD

This disclosure relates to systems and methods for handling yarn packages.

BACKGROUND

Conventionally, yarn packages formed on a winder of a heat set are handled by an operator. The operator cuts a yarn sample, ties a loose end of the yarn package, and stacks the yarn package on a pallet. This requires a substantial number of operators and exposes the operators to typical occupational hazards. Accordingly, a way to reduce direct operator interaction is desirable.

Further, conventionally, an operator cuts a yarn sample from a yarn package to dye and test the sample for quality assurance purposes. An operator subsequently ties the loose end of the yarn package to secure the package. This operation exposes operators to typical occupational hazards. Accordingly, a way to reduce direct operator interaction is desirable.

SUMMARY

Described herein, in various aspects, is a system having at least one winder configured to wind yarn to form a yarn package. At least one sampling and tying machine is configured to remove a portion of the yarn of the yarn package and tie off a free end of the yarn around the yarn package to inhibit the yarn package from unwinding. A dunnage supply area has therein at least one support structure for receiving a plurality of yarn packages thereon. The system further includes at least one case assembly area and a robotic arm. The robotic arm is configured to move the yarn package from the at least one winder to the at least one sampling and tying machine: move the yarn package from the at least one sampling and tying machine to the at least one case assembly area: and stack the yarn package on a support structure in the at least one case assembly area.

In another aspect, a method includes winding, by a winder, yarn to form a yarn package. A robotic arm moves the yarn package from the winder to at least one sampling and tying machine. The robotic arm moves the yarn package from the at least one sampling and tying machine to a case assembly area. The robotic arm stacks the yarn package on a support structure in the at least one case assembly area.

Also described herein, in various aspects, is a system for sampling and tying yarn of a package having a free end. The system includes a spindle and a first actuator. The first actuator is configured to rotate the spindle in a first direction and opposed second direction. A yarn sampling assembly is configured to receive a portion of the yarn comprising the free end. A yarn tying assembly is configured to tie a knot in the yarn of the package to prevent unwinding of the yarn from the package.

In another aspect, a method includes receiving a package comprising yarn on a spindle. The yarn has a free end. A first actuator coupled to the spindle rotates the package to deliver the free end to a sampling assembly. The sampling assembly removes a portion of the yarn comprising the free end to provide a yarn sample and to form a new free end of the yarn remaining on the spindle.

DETAILED DESCRIPTION

Figure 1:
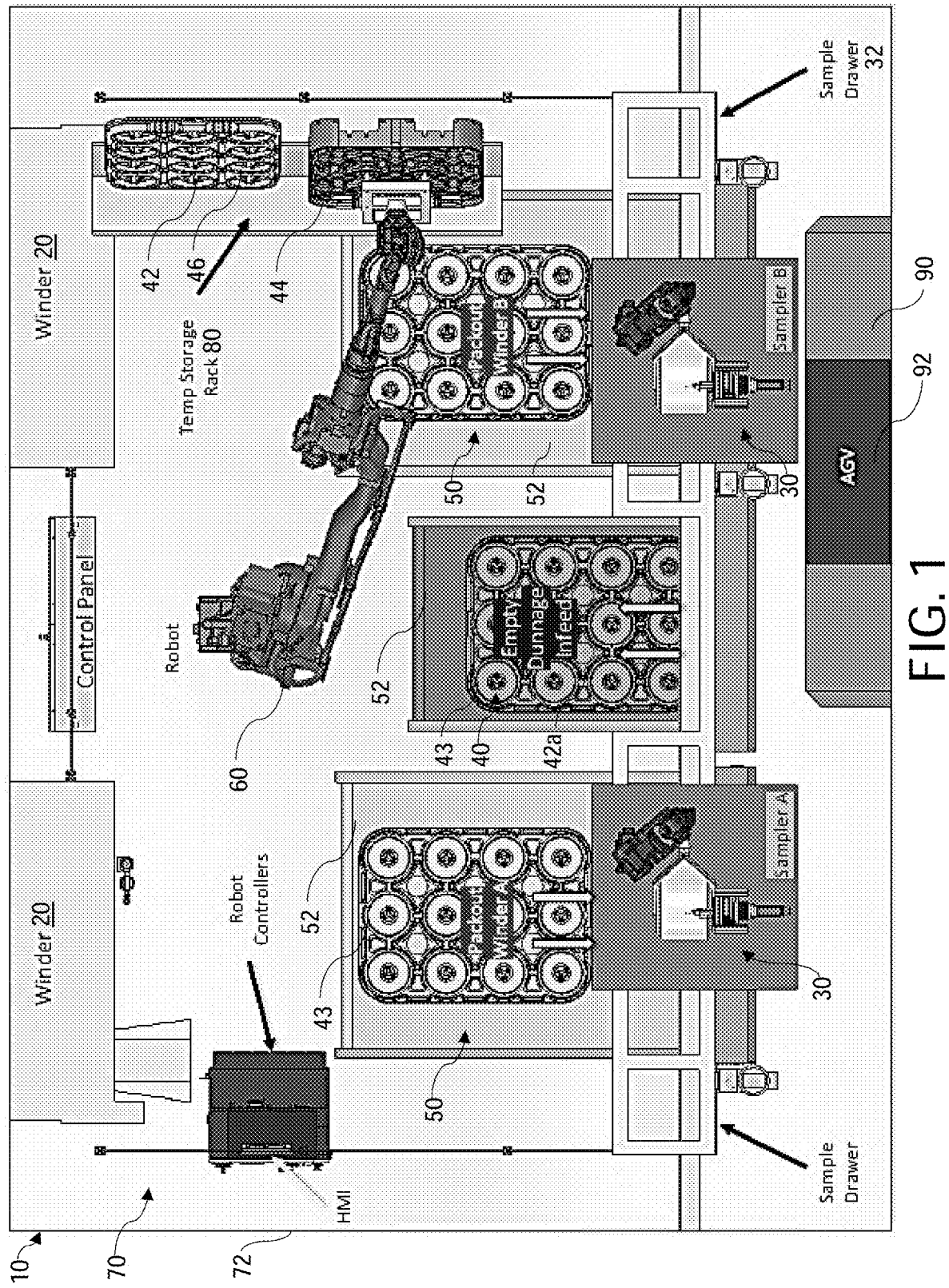
FIG. 1 is a top plan view of a system as disclosed herein.

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout. It is to be understood that this invention is not limited to the particular methodology and protocols described, as such may vary. It is also to be understood that the terminology used herein is for the purpose of describing particular embodiments only, and is not intended to limit the scope of the present invention.

Many modifications and other embodiments of the invention set forth herein will come to mind to one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

As used herein the singular forms "a," "an," and "the" can include plural referents unless the context clearly dictates otherwise. For example, use of the term "a winder" can represent disclosure of embodiments in which only a single winder is provided, and in alternative aspects, unless the context dictates otherwise, can also represent disclosure of embodiments in which a plurality of such winders are provided.

All technical and scientific terms used herein have the same meaning as commonly understood to one of ordinary skill in the art to which this invention belongs unless clearly indicated otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. Optionally, in some aspects, when values are approximated by use of the antecedent "about," it is contemplated that values within up to 15%, up to 10%, up to 5%, or up to 1% (above or below) of the particularly stated value can be included within the scope of those aspects. Similarly, in some optional aspects, when values are approximated by use of the terms "approximately," "substantially," or "generally," it is contemplated that values within up to 15%, up to 10%, up to 5%, or up to 1% (above or below) of the particular value can be included within the scope of those aspects. When used with respect to an identified property or circumstance, "substantially" or "generally" can refer to a degree of deviation that is sufficiently small so as to not measurably detract from the identified property or circumstance, and the exact degree of deviation allowable may in some cases depend on the specific context.

As used herein, the terms "optional" or "optionally" mean that the subsequently described event or circumstance may or may not occur, and that the description includes instances where said event or circumstance occurs and instances where it does not.

The word "or" as used herein means any one member of a particular list and, unless context dictates otherwise, can, in alternative aspects, also include any combination of members of that list.

The following description supplies specific details in order to provide a thorough understanding. Nevertheless, the skilled artisan would understand that the apparatus and associated methods of using the apparatus can be implemented and used without employing these specific details. Indeed, the apparatus and associated methods can be placed into practice by modifying the illustrated apparatus and associated methods and can be used in conjunction with any other apparatus and techniques conventionally used in the industry.

INTRODUCTION

Figure 2:
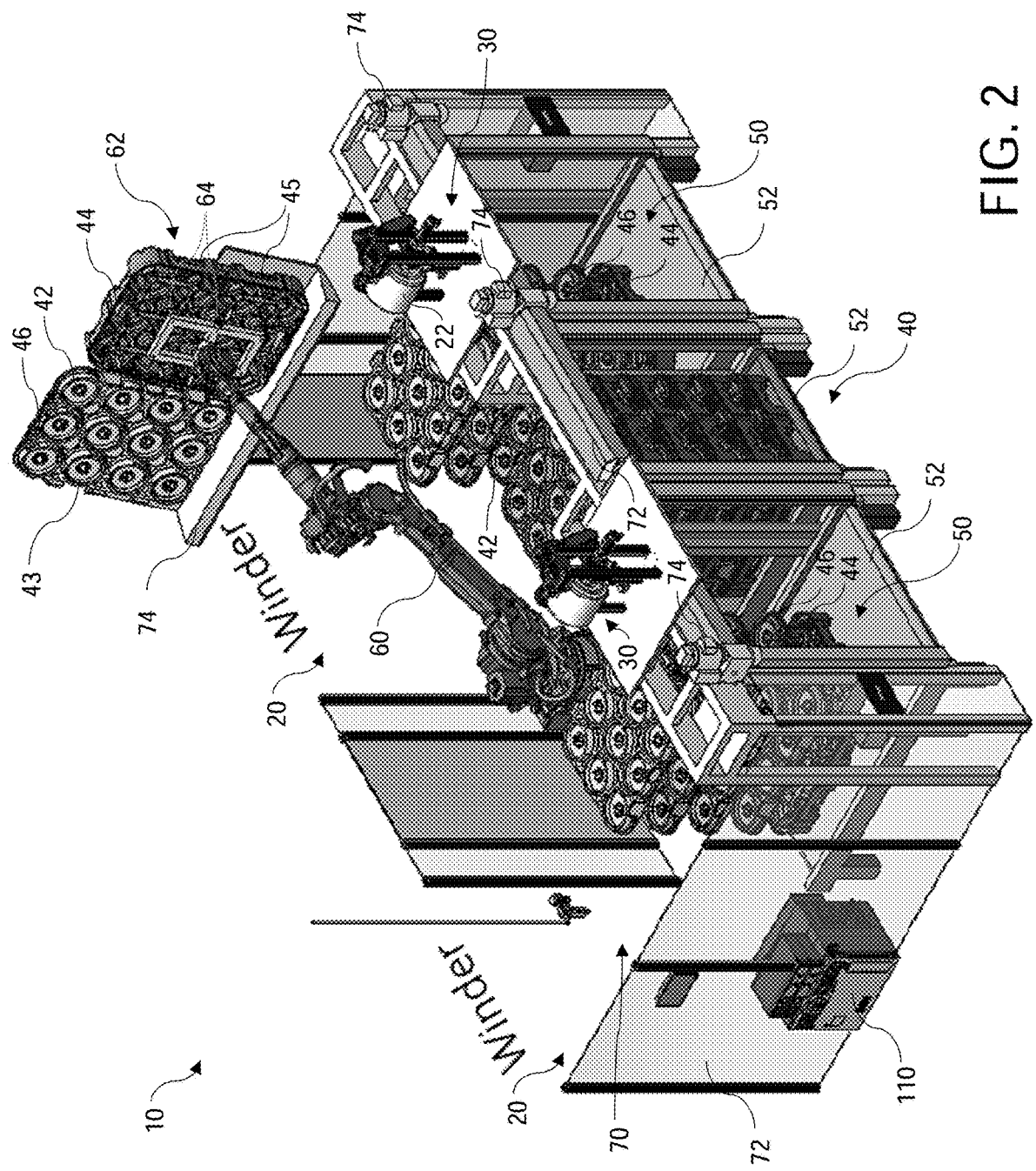
FIG. 2 is a perspective view of the system of FIG. 1

Disclosed herein, and with reference to FIGS. 1 and 2, is a system 10 for handling yarn. The system 10 permits automation for handling yarn packages from once they have been formed on one or more winders 10. For example, the system 10 can move yarn packages from the winder(s) 20 to a sampling and tying machine 30 by a robotic arm 60. The sampling and tying machine 30 can be configured to remove a portion of the yarn of the yarn package and tie off a free end of the yarn around the yarn package to inhibit the yarn package from unwinding. Once the yarn package has been sampled and the free end of the yarn has been tied, the robotic arm can stack the yarn to form a case 50. In some aspects, the case can comprise yarn packages stacked on one or more support assemblies (referred to herein collectively as dunnage). Automated guided vehicles (AGVs) can remove cases and deliver dunnage for forming additional cases.

EXEMPLARY EMBODIMENTS

In some aspects, the system 10 can comprise at least one winder 20 configured to wind yarn to form a yarn package 22 as is known in the art. The at least one winder 20 can be, for example, a winder of a heat set apparatus 24 as is known in the art. Typically, the winder receives yarn following a heat setting process, and the winder is configured to wind the yarn (for example, around a substrate such as a tube or cone) to form yarn packages 22. The winder can have a driven roller in contact with the yarn package. The driven roller can rotate the yarn package to wind yarn around the substrate (e.g., as the yarn leaves the heat set apparatus 24).

The system 10 can further comprise at least one sampling and tying machine 30. Each sampling and tying machine 30 can be configured to remove a portion of the yarn of the yarn package 22 and tie off a free end of the yarn around the yarn package to inhibit the yarn package from unwinding. The sampling and tying machine(s) 30 can deliver yarn into respective sample drawers 32. A quality control specialist can retrieve the samples in the sample drawers 32 for testing. Further aspects of exemplary sampling and tying machine(s) 30 are described in detail herein.

The system 10 can comprise a dunnage supply area 40 having therein one or a plurality of support structures 42 for receiving a plurality of yarn packages thereon. The support structures 42 can include pallets 44 that can form bottoms of a case 48 (shown without yarn packages to include detail of the support structures) as well as spacers 46 that are positioned between adjacent layers of yarn packages. Optionally, a spacer 46 can also form a top layer (e.g., a cap) of a case 48. Each of the support structures 42 can comprise features that support the position of the packages positioned thereon. For example, the support structures 42 can define cylindrical recesses 43 that are configured to support the yarn packages 22 and maintain the yarn packages in particular spacing. The pallets 44 can further define receptacles 45 for receiving forks of a fork truck.

The system 10 can comprise at least one case assembly area 50 for forming cases 48. In some optional aspects, each case 48 can comprise a pallet 44 defining a bottom of the case. One or more layers of yarn packages 22 can be stacked on the pallet 44. For example, the case 48 can comprise one layer, two layers, three layers, four layers, or more than four layers of yarn packages 22. Spacers 46 can be positioned between each layer of yarn packages 22. Optionally, a spacer 46 can define a top of the case 48.

Figure 5:
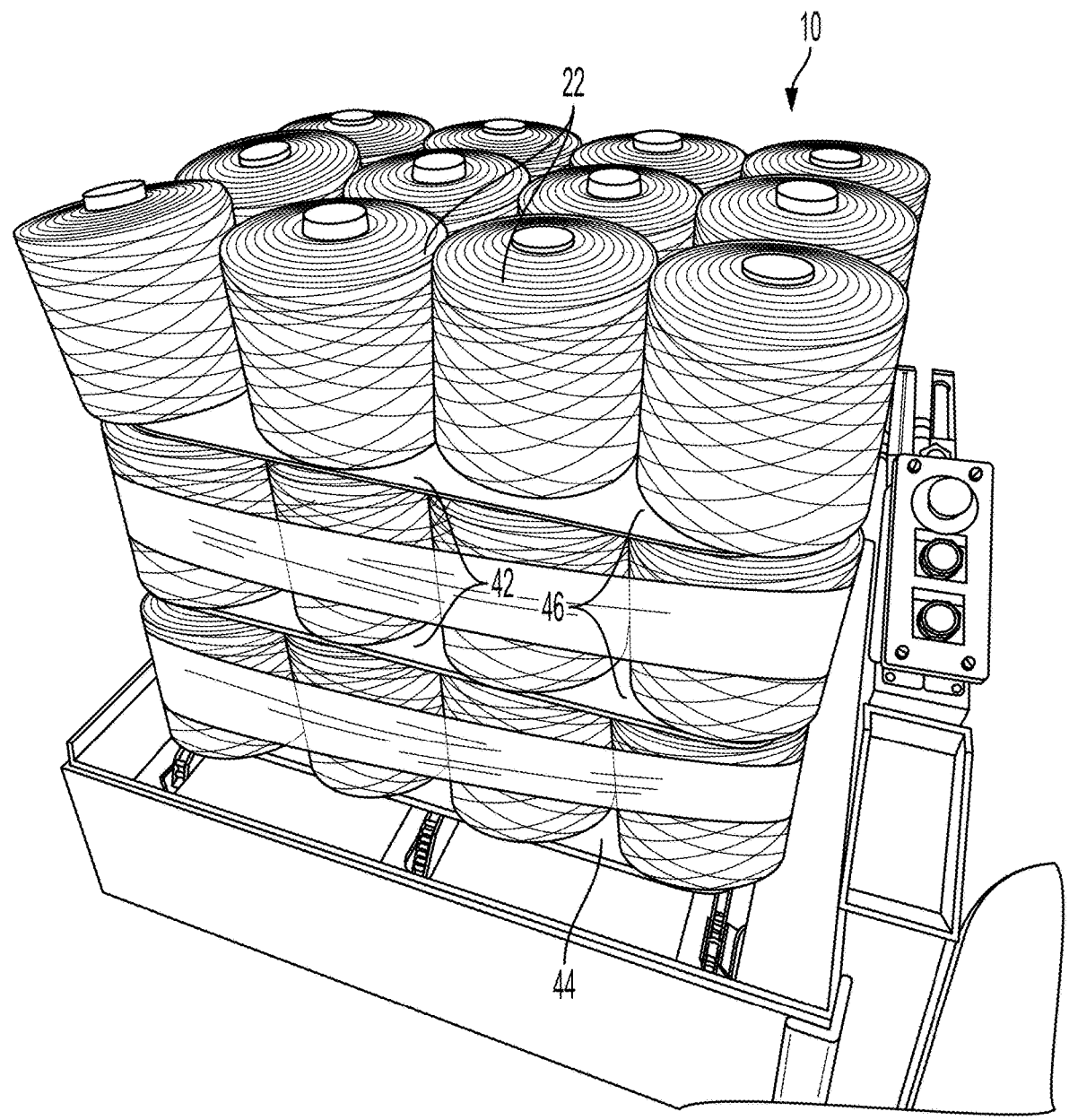
FIG. 5 illustrates an exemplary case as disclosed herein.

Referring to FIG. 5, in further exemplary aspects, the pallet 44 can be a sheet. For example, the pallet 44 can be a cardboard sheet. In exemplary aspects, the pallet can be a flat cardboard sheet. In further aspects, each spacer 46 can be a sheet (e.g., a cardboard sheet). In some aspects, the pallet 44 and the spacers 46 can be similar or identical. For example, the same types of cardboard sheets can be used as both the pallet 44 and the spacers 46. Thus, in some aspects, the support structures can be interchangeable. In these aspects, elements for managing the stack of support structures comprising different elements (such as a staging rack) can be omitted. Optionally, the pallet 44 and spacers 46 can have horizontal dimensions that are slightly smaller than the case 48 so that the yarn packages 22 on the outer edges extend outwardly from the pallet 44 and the spacers 46.

The system 10 can comprise a robotic arm 60. The robotic arm 60 can be configured to move each yarn package 22 from the one or more winders 20 to the one or more sampling and tying machines 30. The robotic arm 60 can then move the yarn package 22 from the at least one sampling and tying machine 30 to the at least one case assembly area 50 and stack the yarn package 22 on a support structure 42 in the at least one case assembly area 50.

In some aspects each winder 20, each sampling and tying machine 30, the dunnage supply area 40, the at least one case assembly area 50, and the robotic arm 60 can be within a locked-out area 70. For example, the system 10 can comprise a barrier 72 that surrounds the locked-out area 70. The barrier 72 can comprise at least one retractable door 74 that selectively permits access to the locked-out area 70. For example, a retractable door 74 can be positioned in front of each case assembly area 50 and the dunnage supply area 40. In this way, dunnage can be delivered, and cases 48 can be removed. Each retractable door 74 can comprise an actuator 76 that is configured to rotate in a first direction to roll the door upwardly and in a second direction to lower the door.

In some aspects, each case assembly area 50 can comprise a conveyor 52. The conveyor 52 can be, for example, a belt conveyor. The conveyor 52 can move a case 48 out of a respective retractable door 74 and onto an AGV 90. Similarly, the dunnage supply area 40) can comprise a conveyor 52 that receives support structures 42 from an AGV 90 and moves the support structures into the system through a retractable door 74.

In exemplary aspects, the support structure(s) 42 in the dunnage supply area 40 can include at least one pallet 44, at least one spacer 46, or a combination thereof. For example, the support structures 42 can be provided to the dunnage supply area 40 according to ratios in which the support structures are used. For an exemplary system that is configured to form a case 48 having one pallet 44, four layers of yarn packages 22, spacers 46 between each layer of yarn packages and a spacer 46 defining a top of the case, the case can use, in total, one pallet 44 and four spacers 46. Dunnage can, therefore, be delivered in the same ratio of four spacers 46 and one pallet 44, and arranged in the order in which completed cases. For example, as shown in FIG. 2, the support structure(s) 42 can be provided in a stack of alternating pallets 44 and a corresponding number of spacers 46 used with each pallet. A single dunnage delivery can comprise a plurality of pallets (e.g., 2, 3, 4, 5, or more pallets) and a corresponding ratio of spacers.

The robotic arm 60 can further be configured to handle the support structures 42. For example, the robotic arm 60) can be configured to move a support structure 42 of the at least one support structure in the dunnage supply area 40 to the at least one case assembly area 50. For example, the robotic arm 60 can place a pallet in an empty case assembly area. The robotic arm 60 can place spacers 46 on top of completed layers of yarn packages 22.

The robotic arm 60 can comprise a dual-function end of arm tool (EOAT) 62. The EOAT can comprise a first gripper that is configured to grip a yarn package. In some exemplary aspects, the first gripper can comprise a plurality of projections that can be inserted into the tube of a yarn package 22 and move radially outwardly from each other to bias against inner surfaces of the tube. For example, the first gripper can comprise two, three, four, or more projections that move radially outwardly. The projections can be retracted inwardly to release the yarn package. The EOAT 62 can further comprise a second gripper for gripping and releasing the support structures 42. The second gripper can comprise, for example, a vacuum gripper. For example, the EOAT can comprise a vacuum supply (e.g., a pump) and one or more suction cups 64 (six shown) that are in communication with the vacuum supply and configured to apply negative pressure from the vacuum supply to grip the support structure.

The system 10 can further comprise a staging rack 80 that is configured to store at least one support structure from the dunnage supply area. For example, as shown, a single stack of support structures is provided for supplying two case assembly areas 50. Accordingly, it can be understood that the top support structure 42a of the stack of support structures 42 can be either a pallet or a spacer. Depending on the current stack the partially assembled case 48 requiring the next support structure, it may or may not need the top support structure 42a of the stack of support structures 42. Thus, the robotic arm 60 can pick from either the top support structure 42a or the staging rack 80. The robotic arm 60 can further take the top support structure 42a and position it on the staging rack, thereby exposing a lower support structure below the top support structure. Accordingly, the system 10 can be configured to track inventory of the order of the support structures 42 in the dunnage supply area 40) as well as the support structures 42 on the staging rack 80. The staging rack 80 can be configured to hold at least one support structure 42, at least two support structures 42, or exactly two support structures 42.

The system 10 can further comprise one or a plurality of automated guided vehicles (AGVs) 90. The AGV(s) 90 can be configured to deliver the support structures 42 to the dunnage supply area 40. The AGV(s) 90 can further be configured to carry the cases 48 from the case assembly area 40. Each AGV 90 can comprise a conveyor 92 that is configured to align with a respective conveyor 52 to transfer support structures 42 and cases 48.

In some aspects, the at least one winder 20 can comprise two winders. In some aspects, the at least one sampling and tying machine 30 can comprise two sampling and tying machines. In some aspects, the at least one case assembly area 50 can comprise two case assembly areas. The system 10 can comprise logic that is configured to control transfer yarn packages from a first winder, to a first sampling and tying machine, to a first case assembly area, and to control transfer yarn packages from a second winder, to a second sampling and tying machine, to a second case assembly area.

Figure 3:
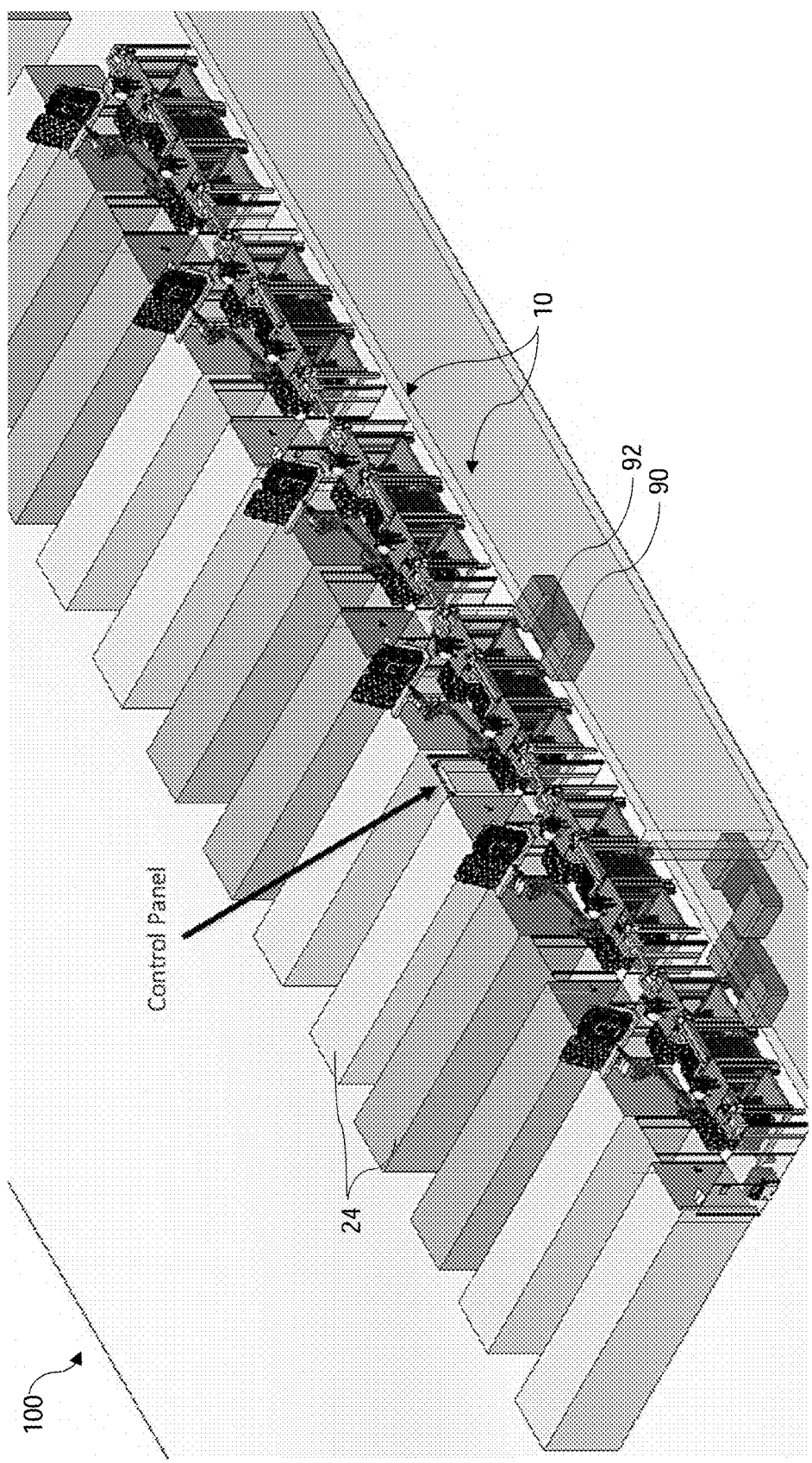
FIG. 3 is perspective view of a global system of a plurality of systems as shown in FIG. 1.

Referring to FIG. 3, in some aspects, a global system 100 can comprise a plurality of systems 10 as disclosed herein and a plurality of AGVs 90 to deliver dunnage to and receive cases from the plurality of systems 10.

Figure 6:
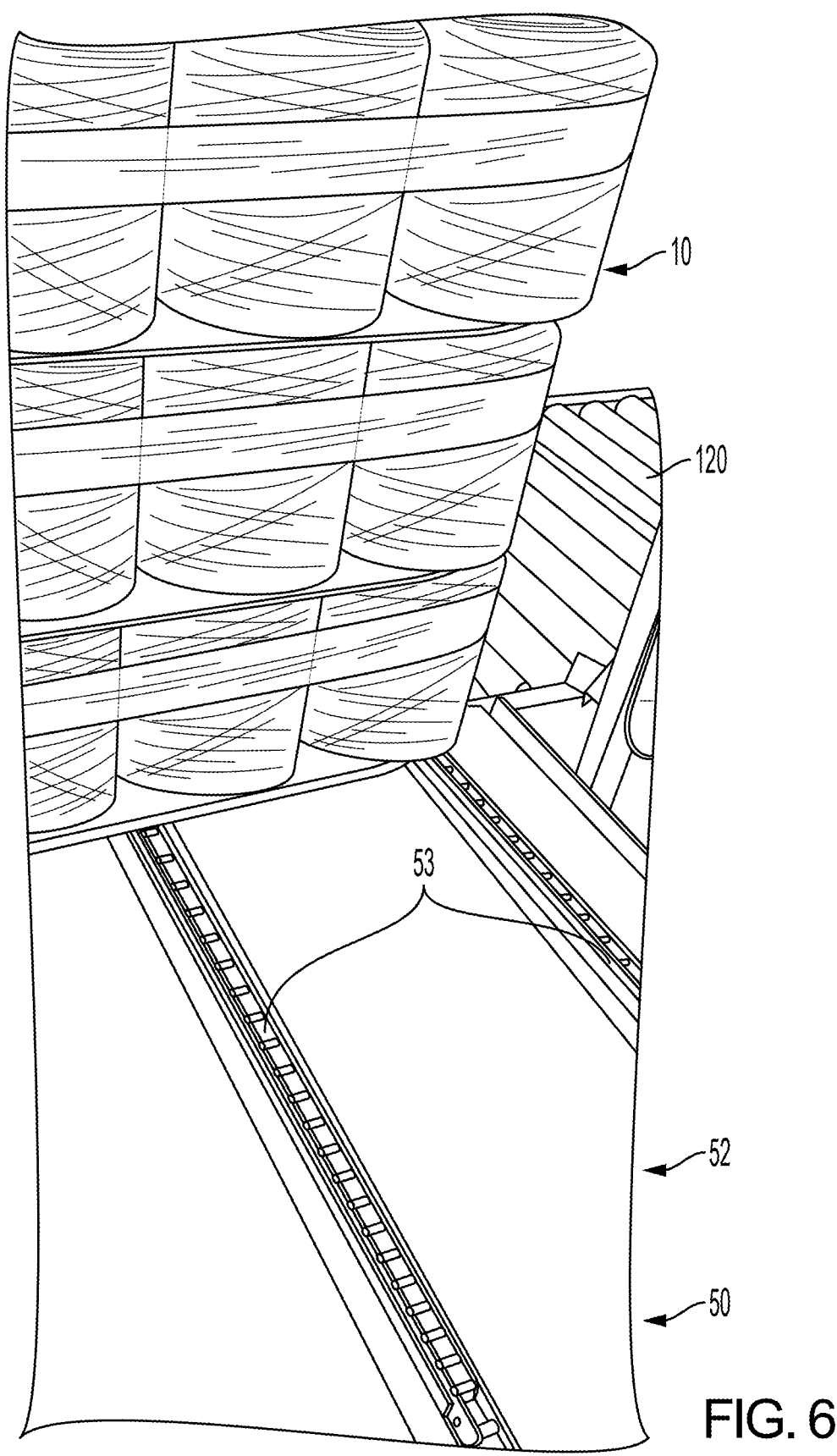
FIG. 6 illustrates the exemplary case of FIG. 5 being transported on a first conveyor to a second conveyor.

In further or alternative aspects, and with reference to FIGS. 5-6, a conveyor 120 (e.g., a roller conveyor) can receive the case 48 from the conveyor 52 and carry the case from the winder 20. For example, the conveyor 52 can comprise tracks 53 that can move horizontally to carry the case 48 laterally. The tracks 53 can then move vertically downwardly to place the case 48 on the conveyor 120.

Figure 7:
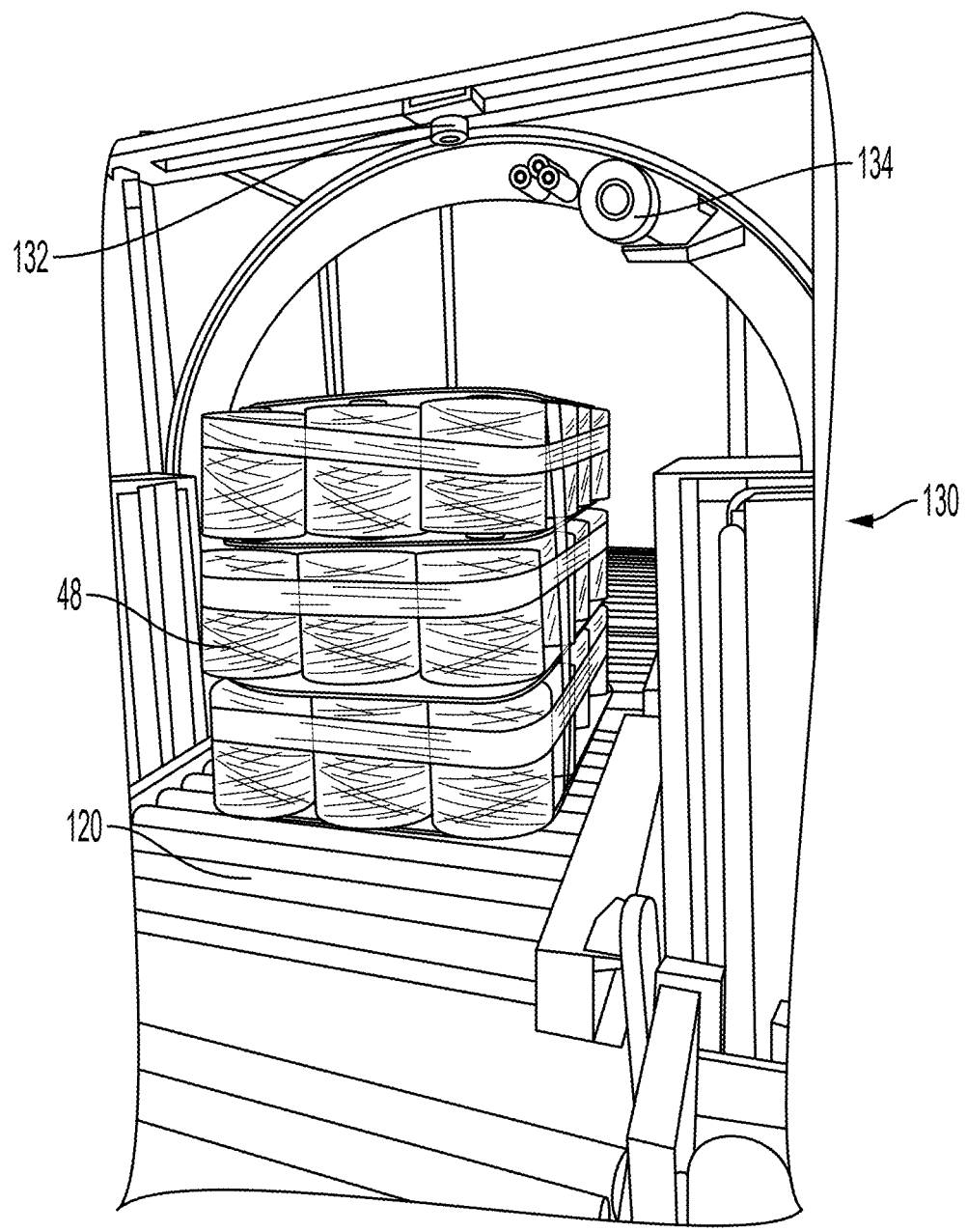
FIG. 7 illustrates an exemplary first wrapper as disclosed herein.

In some optional aspects, case 48 can be wrapped in a wrapping material (e.g., polymer wrap). For example, referring to FIGS. 6 and 7, the conveyor 120 can carry the case 48 from the case assembly area 50 to a first wrapper 130 that is configured to wrap the case about a first axis (e.g., a horizontal axis). In exemplary aspects, the first wrapper 130 can surround the case 48 so that the case 48 is receivable therein. The first wrapper 130 can comprise an actuator 132 that moves a material roll 134 around a periphery of the case about the first axis to wrap the wrapping material around the case 48. In exemplary aspects, the first wrapper can comprise a wheel that rotates around the package, and the material roll 134 can be mounted to the wheel. In some aspects, the first axis can be parallel to, or substantially parallel to, an axis of movement of the conveyor 53.

In further aspects, a second wrapper 140 can be configured to wrap the case 48 about a second axis (e.g., vertical axis). For example, referring to FIG. 8, the second wrapper 140 can provide wrapping around the case 48 so that said wrapping surrounds a vertical axis that extends through the case 48. In some aspects, the second wrapper 140 can comprise a rotatable platform 142 that rotates to thereby rotate the case 48 relative to a second roll of wrapping material. The second wrapper 140 can further comprise a stabilizing plate 144 that is vertically movable to be positioned on top of the case 48. The stabilizing plate 144 can retain the case 48 on the rotatable platform 142 as the rotatable platform rotates relative to the roll of wrapping material so that said wrapping material is applied to an outer periphery of the case.

Method of Use

A method can comprise winding, by a winder 20, yarn to form a yarn package 22. A robotic arm 60 can move the yarn package 22 from the winder 20 to at least one sampling and tying machine 30. The robotic arm 60 can move the yarn package 22 from the at least one sampling and tying machine 30 to a case assembly area 50. The robotic arm 60 can stack the yarn package 22 on a support structure 42 in the at least one case assembly area.

In some aspects, the robotic arm 60 can stack a first layer of yarn packages on a pallet 44, place a spacer 46 on the first layer of yarn packages 22, and stack a second layer of yarn packages on the spacer 46. In further aspects, the robotic arm 60 can stack a second layer of yarn packages and a second spacer 46 on the second layer of yarn packages. In further aspects, the robotic arm 60 can stack a third layer of yarn packages and a third spacer 46 on the second layer of yarn packages. In further aspects, the robotic arm 60 can stack a fourth layer of yarn packages and a fourth spacer 46 on the second layer of yarn packages.

In some aspects, the robotic arm can move a support structure 42 from a staging rack 80 to the at least one case assembly area 50. In some aspects, the robotic arm 60 can move a support structure 42 from a dunnage supply area 40 to the staging rack 80.

In some aspects, each step of the method disclosed herein is performed within a locked-out area.

Computing Device

The system 10 can comprise at least one computing device for controlling operation of the system. For example, one or more computing devices can control a plurality of operations, including: movement of the robotic arm 60 and actuation of the end of arm tool 62: operation of the conveyors 52 and the doors 74: coordination with the winder 20 and the at least one sampling and tying machine 30: dispatch of the AGVs 90: operation of the AGVs. In some optional aspects, a single computing device controls a plurality of such operations. In some aspects, the system 10 can comprise a plurality of computing devices that operate in coordination. For example, a first computing device (e.g., a controller) can control movement of the robotic arm 60, and a second computing device can coordinate operation of the arm, directing the first computing device where to next position the robotic arm, and further maintain inventory of the support structures in the dunnage supply area 40 and on the staging rack 80. Still another computing device can dispatch AGVs 90. The AGVs 90 can further comprise respective computing devices that control operation of integral components (e.g., motors driving the wheels of the AGV and the conveyor 92). Still another computing device can provide an operator with an interface at a human machine interface 110 for permitting the operator to control aspects of the system. Each of said computing devices can optionally be embodied in accordance with the computing device 1001 as further disclosed herein.

Further, at least one computing device (e.g., the same computing device 1001 or another computing device described in accordance with the computing device disclosed herein) can be used for controlling operation of the sampling and tying machine 30. For example, one or more computing devices can control a plurality of operations, including: rotation of the first actuator 330; control of the vacuum 356; and movement of the first gripper 358, the end of arm tool 363 of the robotic arm 361, the robotic arm 361, the yarn cutter 354, and the second actuator. In some optional aspects, a single computing device controls a plurality of such operations. In some aspects, the sampling and tying machine 30 can comprise a plurality of computing devices that operate in coordination. For example, a first computing device (e.g., a controller) can control movement of the robotic arm 361, and a second computing device can coordinate operation of the arm, directing the first computing device where to next position the robotic arm 361. Still another computing device can provide an operator with an interface at a human machine interface for permitting the operator to control aspects of the system. Each of said computing devices can optionally be embodied in accordance with the computing device 1001 as further disclosed herein.

Figure 4:
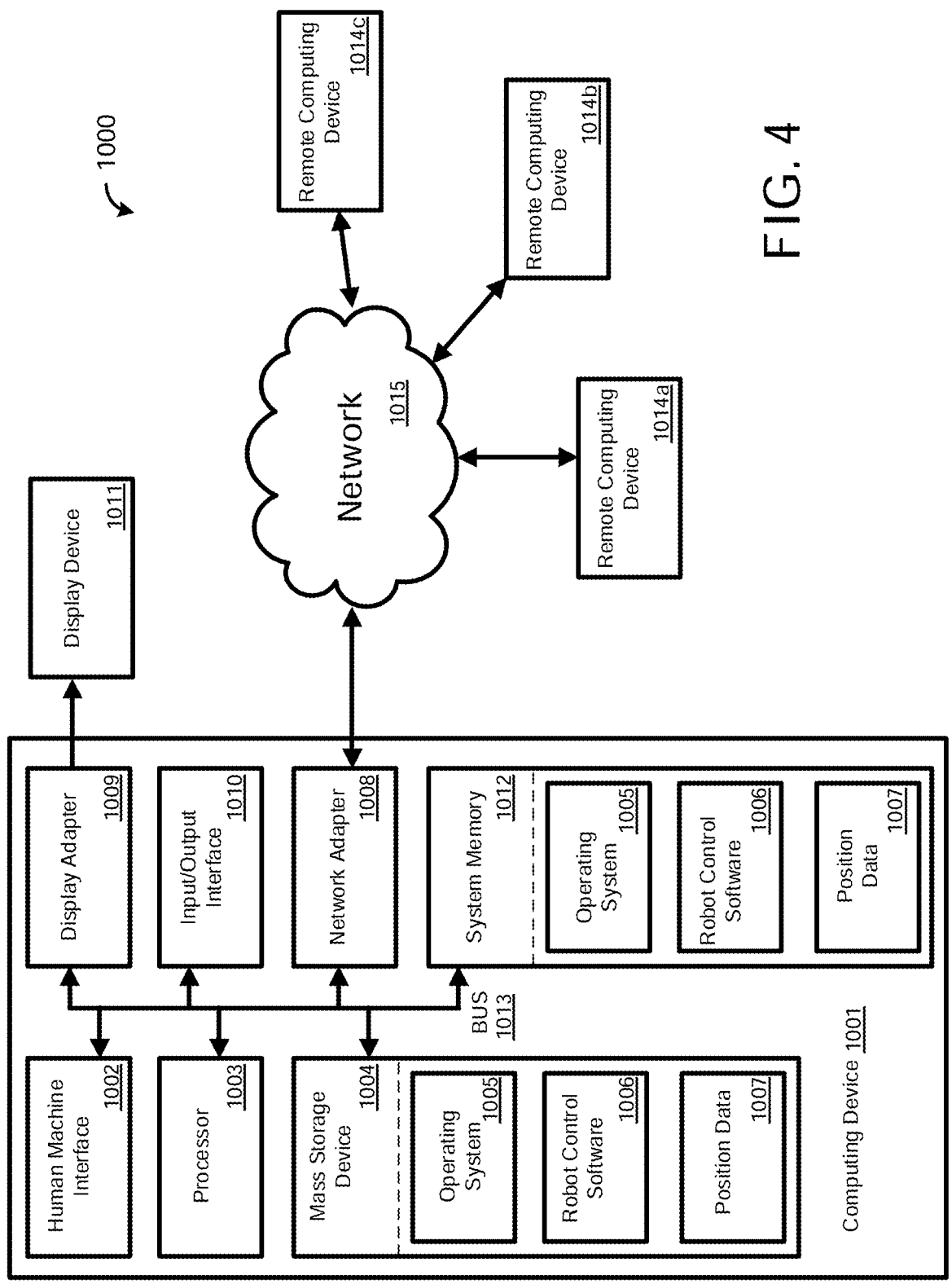
FIG. 4 is a block diagram of an operating environment comprising a computing device as disclosed herein for controlling the system of FIG. 1.
Figure 12:
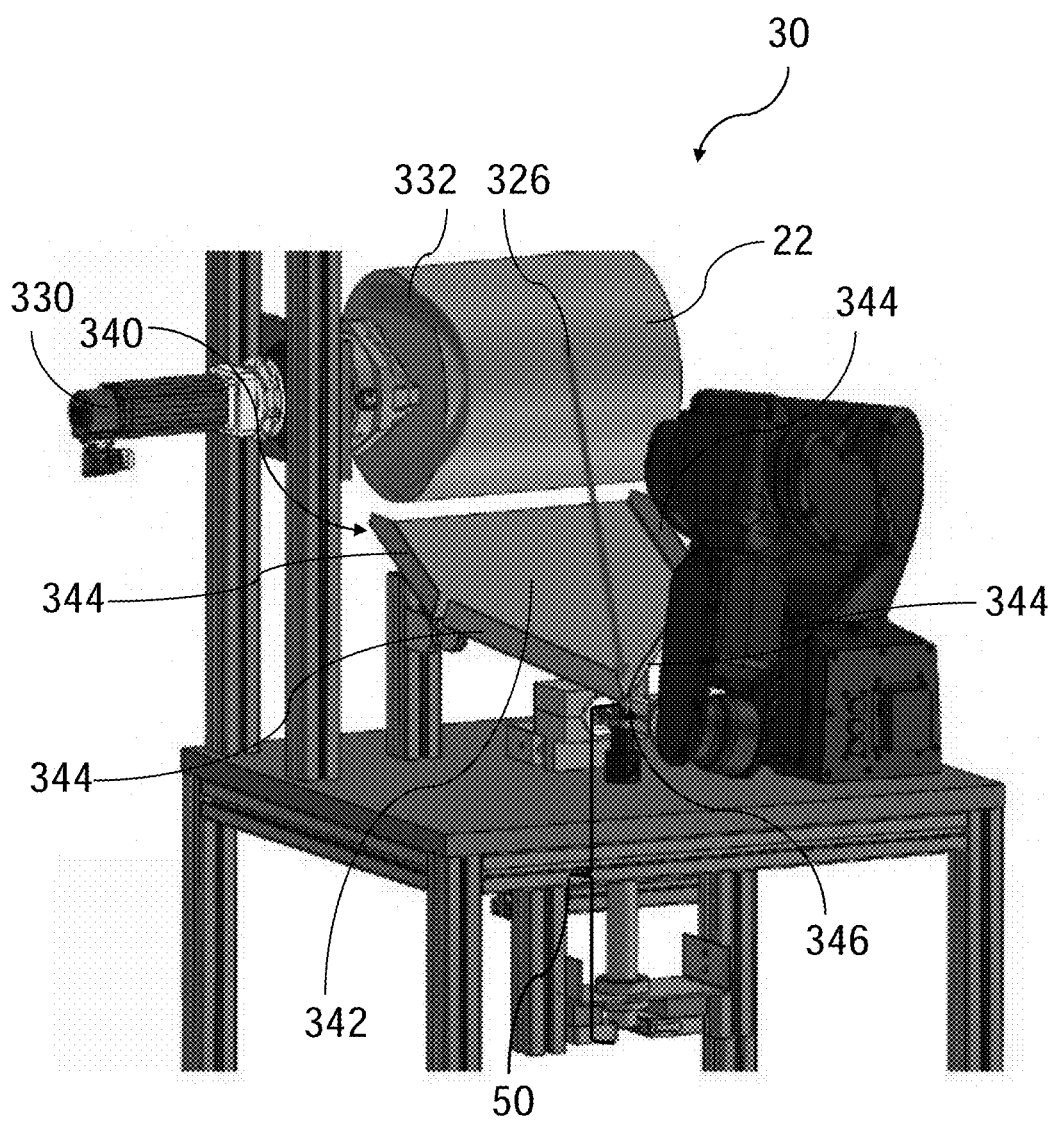
FIG. 12 is a perspective view of the exemplary sampling and tying machine of FIG. 10 showing an exemplary yarn sampling assembly.

FIG. 4 shows an exemplary operating system 1000 including an exemplary configuration of a computing device 1001 for use with the system 10 (FIG. 1) and the sampling and tying machine 30 (FIGS. 1 and 12).

The computing device 1001 may comprise one or more processors 1003, a system memory 1012, and a bus 1013 that couples various components of the computing device 1001 including the one or more processors 1003 to the system memory 1012. In the case of multiple processors 1003, the computing device 1001 may utilize parallel computing.

The bus 1013 may comprise one or more of several possible types of bus structures, such as a memory bus, memory controller, a peripheral bus, an accelerated graphics port, and a processor or local bus using any of a variety of bus architectures.

The computing device 1001 may operate on and/or comprise a variety of computer readable media (e.g., non-transitory). Computer readable media may be any available media that is accessible by the computing device 1001 and comprises, non-transitory, volatile and/or non-volatile media, removable and non-removable media. The system memory 1012 has computer readable media in the form of volatile memory, such as random access memory (RAM), and/or non-volatile memory, such as read only memory (ROM). The system memory 1012 may store data such as position data 1007 and/or program modules such as operating system 1005 and robot control software 1006 that are accessible to and/or are operated on by the one or more processors 1003.

The computing device 1001 may also comprise other removable/non-removable, volatile/non-volatile computer storage media. The mass storage device 1004 may provide non-volatile storage of computer code, computer readable instructions, data structures, program modules, and other data for the computing device 1001. The mass storage device 1004 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules may be stored on the mass storage device 1004. An operating system 1005 and robot control software 1006 may be stored on the mass storage device 1004. One or more of the operating system 1005 and robot control software 1006 (or some combination thereof) may comprise program modules and the robot control software 1006. The position data 1007 may also be stored on the mass storage device 1004. The position data 1007 may be stored in any of one or more databases known in the art. The databases may be centralized or distributed across multiple locations within the network 1015.

A user may enter commands and information into the computing device 1001 using an input device. Such input devices comprise, but are not limited to, a joystick, a touchscreen display, a keyboard, a pointing device (e.g., a computer mouse, remote control), a microphone, a scanner, tactile input devices such as gloves, and other body coverings, motion sensor, speech recognition, and the like. These and other input devices may be connected to the one or more processors 1003 using a human machine interface 1002 that is coupled to the bus 1013, but may be connected by other interface and bus structures, such as a parallel port, game port, an IEEE 1394 Port (also known as a Firewire port), a serial port, network adapter 1008, and/or a universal serial bus (USB).

A display device 1011 may also be connected to the bus 1013 using an interface, such as a display adapter 1009. It is contemplated that the computing device 1001 may have more than one display adapter 1009 and the computing device 1001 may have more than one display device 1011. A display device 1011 may be a monitor, an LCD (Liquid Crystal Display), light emitting diode (LED) display, television, smart lens, smart glass, and/or a projector. In addition to the display device 1011, other output peripheral devices may comprise components such as speakers (not shown) and a printer (not shown) which may be connected to the computing device 1001 using Input/Output Interface 1010. Any step and/or result of the methods may be output (or caused to be output) in any form to an output device. Such output may be any form of visual representation, including, but not limited to, textual, graphical, animation, audio, tactile, and the like. The display device 1011 and computing device 1001 may be part of one device, or separate devices.

The computing device 1001 may operate in a networked environment using logical connections to one or more remote computing devices 1014*a,b,c*. A remote computing device 1014*a,b,c* may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device or other common network node, and so on. The remote computing devices 1014*a,b,c*, can perform respective operations of the system. For example, one remote computing device 1014*a* can be a controller of an AGV. One remote computing device 1014*b* can control a winding machine. Logical connections between the computing device 1001 and a remote computing device 1014*a,b,c* may be made using a network 1015, such as a local area network (LAN) and/or a general wide area network (WAN), or a Cloud-based network. Such network connections may be through a network adapter 1008. A network adapter 1008 may be implemented in both wired and wireless environments. Such networking environments are conventional and commonplace in dwellings, offices, enterprise-wide computer networks, intranets, and the Internet. It is contemplated that the remote computing devices 1014*a,b,c* can optionally have some or all of the components disclosed as being part of computing device 1001. In various further aspects, it is contemplated that some or all aspects of data processing described herein can be performed via cloud computing on one or more servers or other remote computing devices. Accordingly, at least a portion of the system 1000 can be configured with internet connectivity.

Exemplary Sampling and Tying Machine

Figure 9:
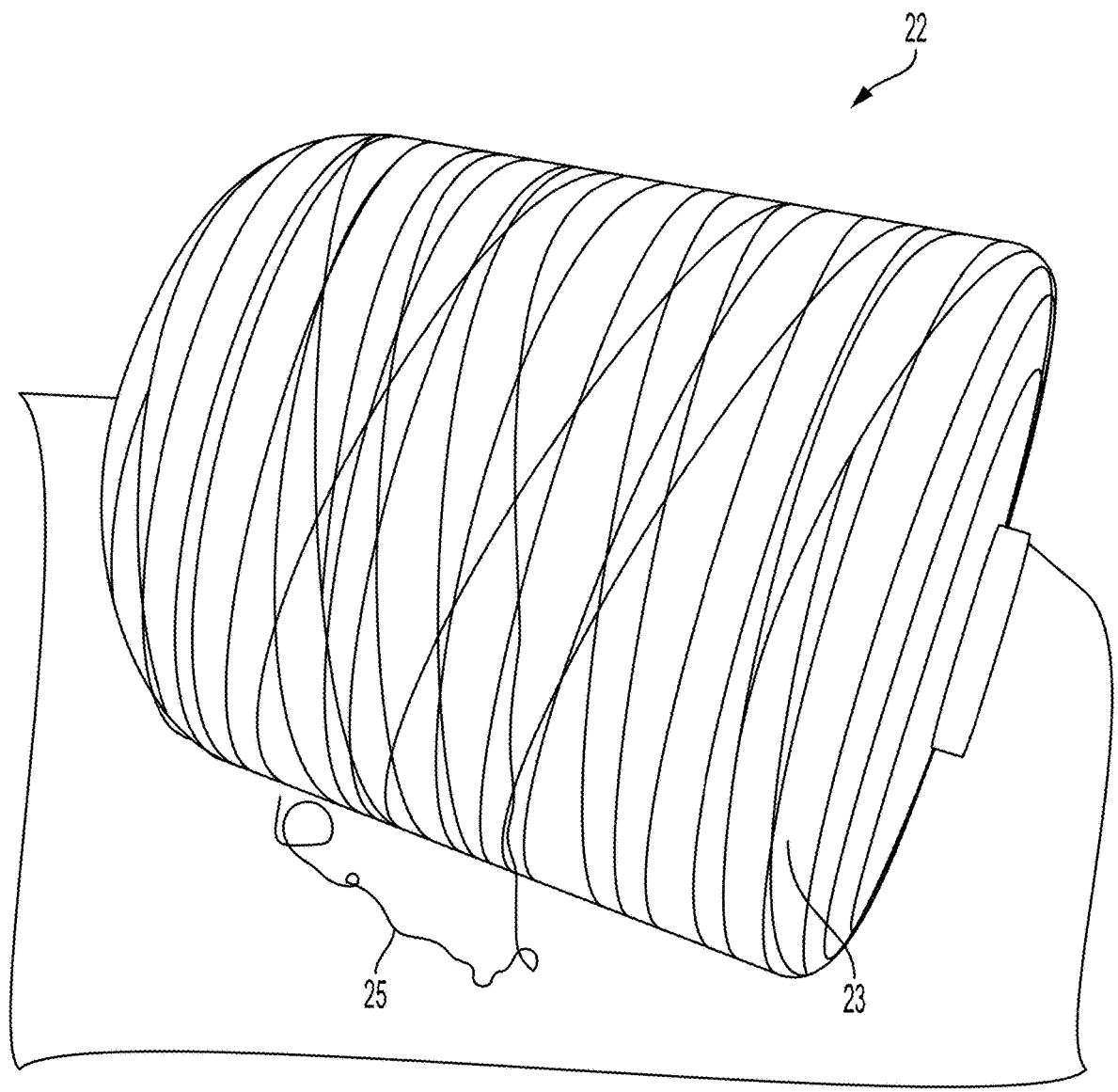
FIG. 9 illustrates an exemplary yarn package as disclosed herein.
Figure 10:
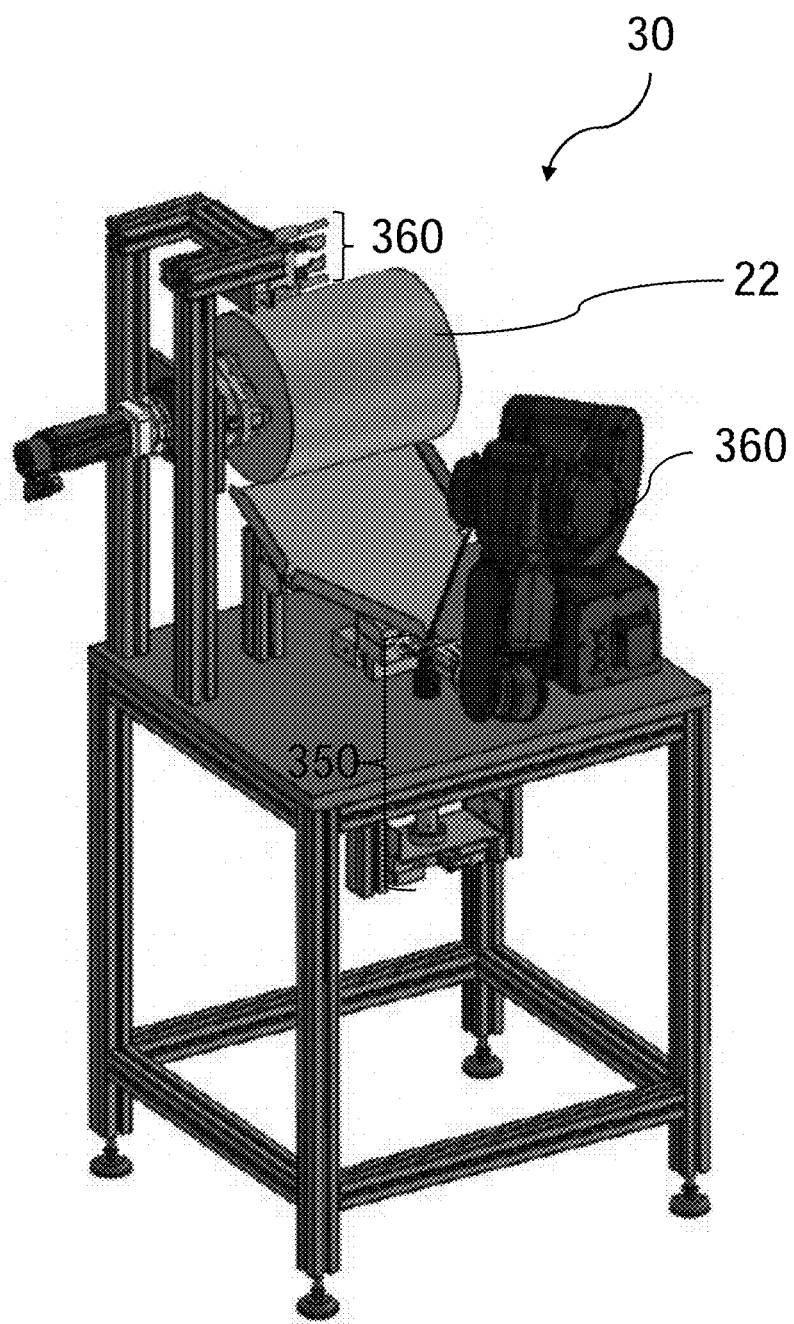
FIG. 10 is a perspective view of an exemplary sampling and tying machine as disclosed herein.

Disclosed herein, and with reference to FIGS. 9-10, is an exemplary sampling and tying machine 30 for sampling and tying yarn 23 of a yarn package 22 having a free end 25. The free end 25 can be defined as the unsecured end of the yarn package's spooled yarn 23. The sampling and tying machine 30 permits automation for sampling yarn 23 from a yarn package 22 and subsequently tying the free end 25 of the yarn 23 around the yarn package 22. For example, the sampling and tying machine 30 can rotate a spindle configured to receive the yarn package 22 in a first direction and an opposed second direction. A yarn sampling assembly 350 of the system can be configured to receive and remove a portion of the free end 25 of the yarn 23 for sampling. After the portion is removed, a yarn tying assembly 360 can be configured to tie off the yarn 23 around the yarn package 22 to inhibit the yarn 23 of the yarn package 22 from unwinding.

Figure 11:
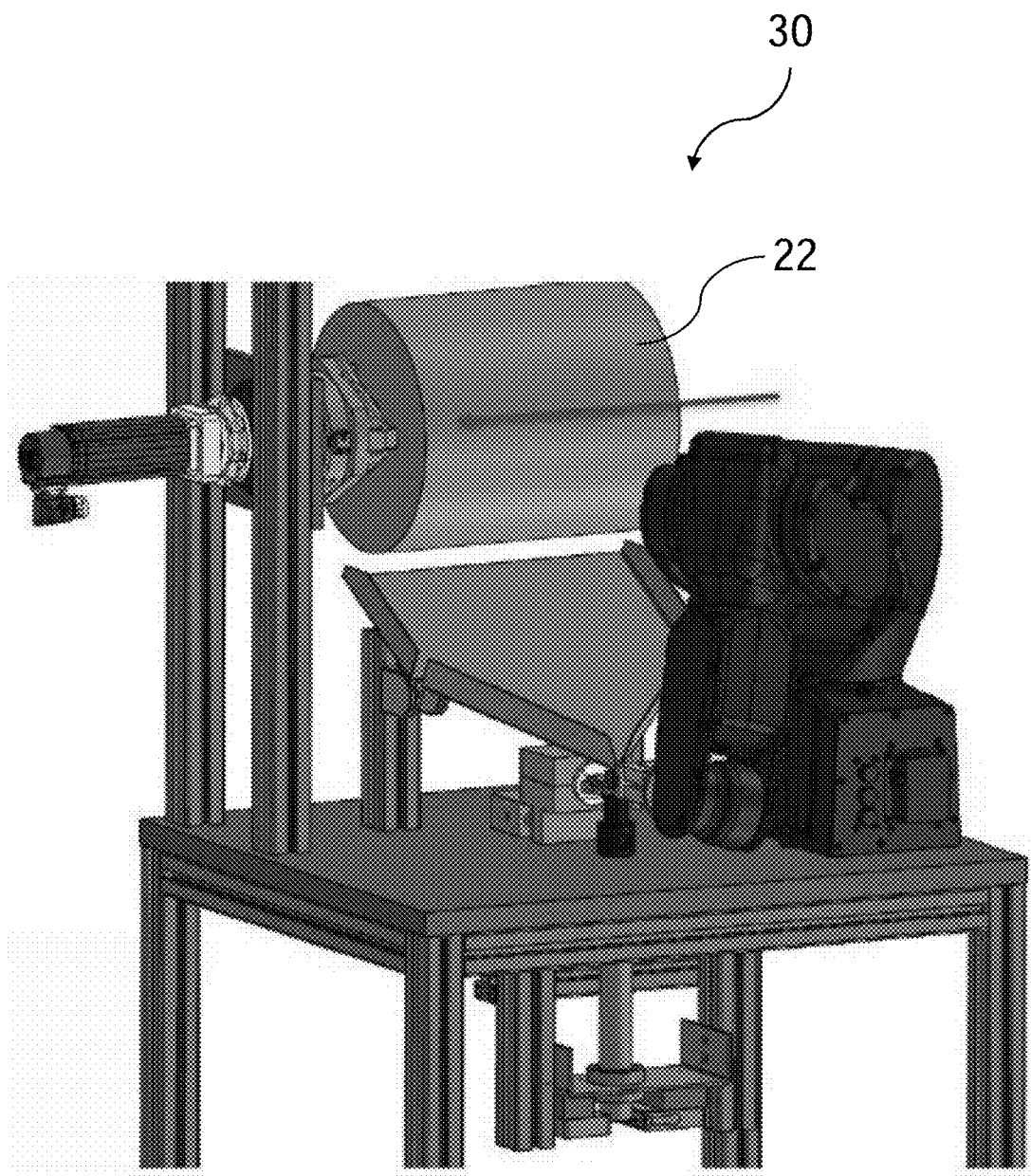
FIG. 11 is a perspective view of the exemplary sampling and tying machine of FIG. 10 showing an exemplary yarn package being loaded.

With reference to FIG. 11, the sampling and tying machine 30 can receive a yarn package 22. In some aspects, the sampling and tying machine 30 can comprise a spindle (not shown) configured to receive the yarn package 22. In one aspect, an operator loads the yarn package 22 onto the spindle by inserting the spindle through the center of the yarn package 22. In one aspect, the spindle can be comprised of at least one gripper configured to expand within the loaded yarn package 22 to hold the yarn package 22 in place.

As shown in FIG. 12, the sampling and tying machine 30 can comprise a first actuator 330 configured to rotate the yarn package 22 by rotating the spindle. The first actuator 330 can be configured to rotate the spindle, and therefore, the yarn package 22, in a first direction indicated by arrow 332 in FIG. 12. Further, the first actuator 330 can be configured to rotate the spindle, and therefore, the yarn package 22, in a second direction opposite the first direction as indicated by arrow 34 in FIG. 10. In one aspect, the first actuator 330 can rotate in the first direction to unwind the free end 25 of the yarn 23 from the yarn package 22.

The sampling and tying machine 30 can further comprise a yarn sampling assembly 350 configured to receive the free end 25 unwound from the loaded yarn package 22. For illustrative purposes, an exemplary free end 25 is represented by arrow 326 in FIG. 12. In one aspect, the sampling and tying machine 30 comprises a guide 340 configured to direct the unwound free end 25 to the yarn sampling assembly 350. In one aspect, the guide 340 includes a base surface 342 and at least one pair of walls 344. The walls 344 can converge toward an opening 346 between the walls 344. The opening 346 can be proximate to the yarn sampling assembly 350. Thus, as the free end 25 is unwound, the free end 25 can slide along the base surface 342. The converging walls 344 direct the free end 25 towards the opening 346 to the yarn sampling assembly 350.

Figure 13:
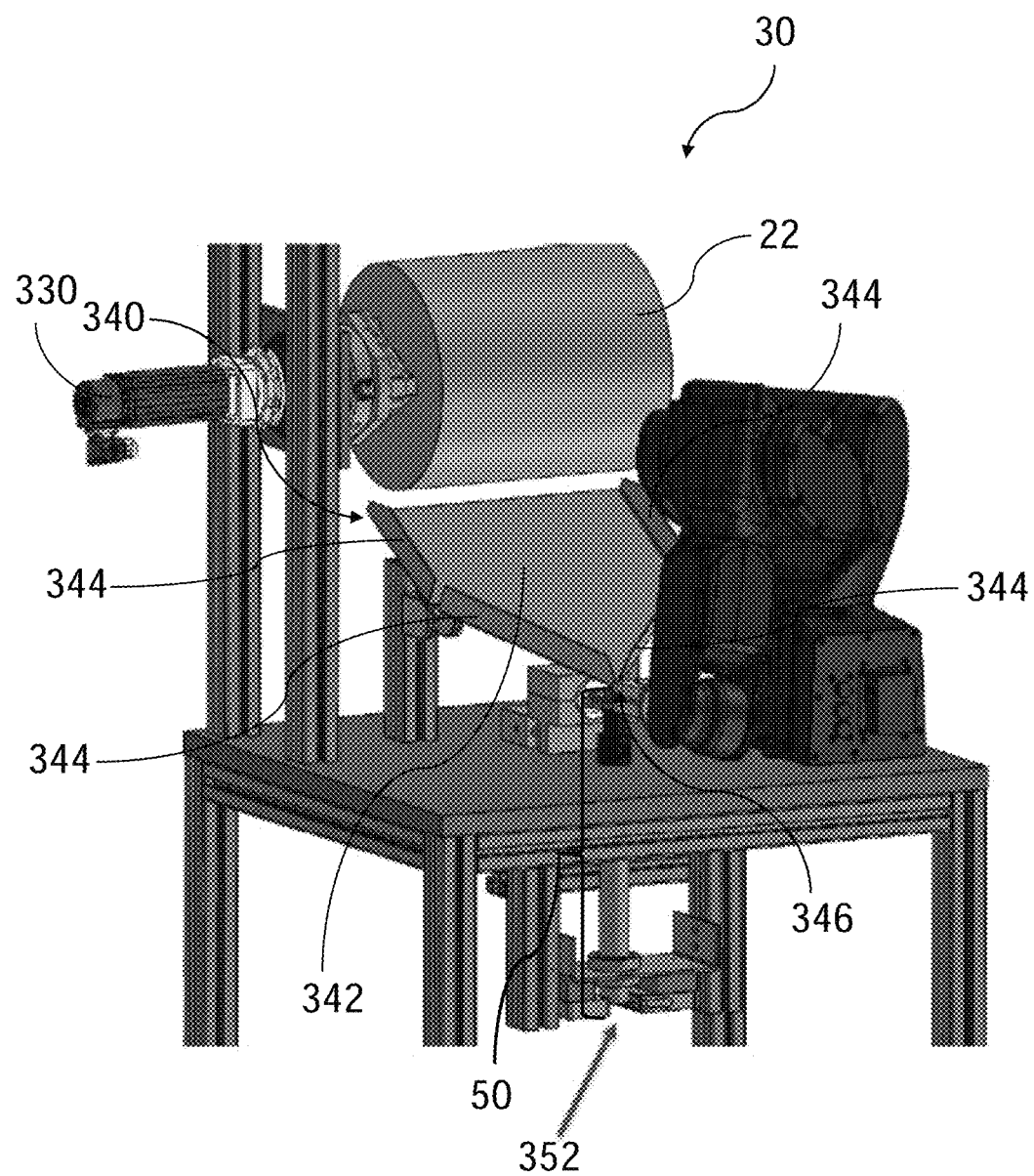
FIG. 13 is a perspective view of the exemplary sampling and tying machine of FIG. 10 showing an exemplary location of a sensor.

In one aspect, the sampling and tying machine 30 may comprise a sensor (not shown) configured to detect when the free end 25 of the yarn 23 is positioned at the yarn sampling assembly 350. For example, a sensor may be located at the opening 346 of the guide 340 to indicate when the free end 25 reaches and/or extends through the opening 346. Alternatively, the sensor may be located towards an end of the yarn sampling assembly 350 indicated by arrow 352 in FIG. 13. The sensor may be located in any location that can detect the length of the yarn sample. The first actuator 330 can continue to unwind the free end 25 of the yarn 23 from the yarn package 22 until the sensor senses the free end 25. When the sensor senses the free end 25 of the yarn 23, the first actuator 330 can stop rotating, and therefore, stop unwinding the free end 25 of the yarn 23. In a further aspect, the sensor can signal when the free end 25 of the yarn 23 is positioned at the yarn sampling assembly 350. The signal can be provided to a computing device as further disclosed herein.

Figure 14:
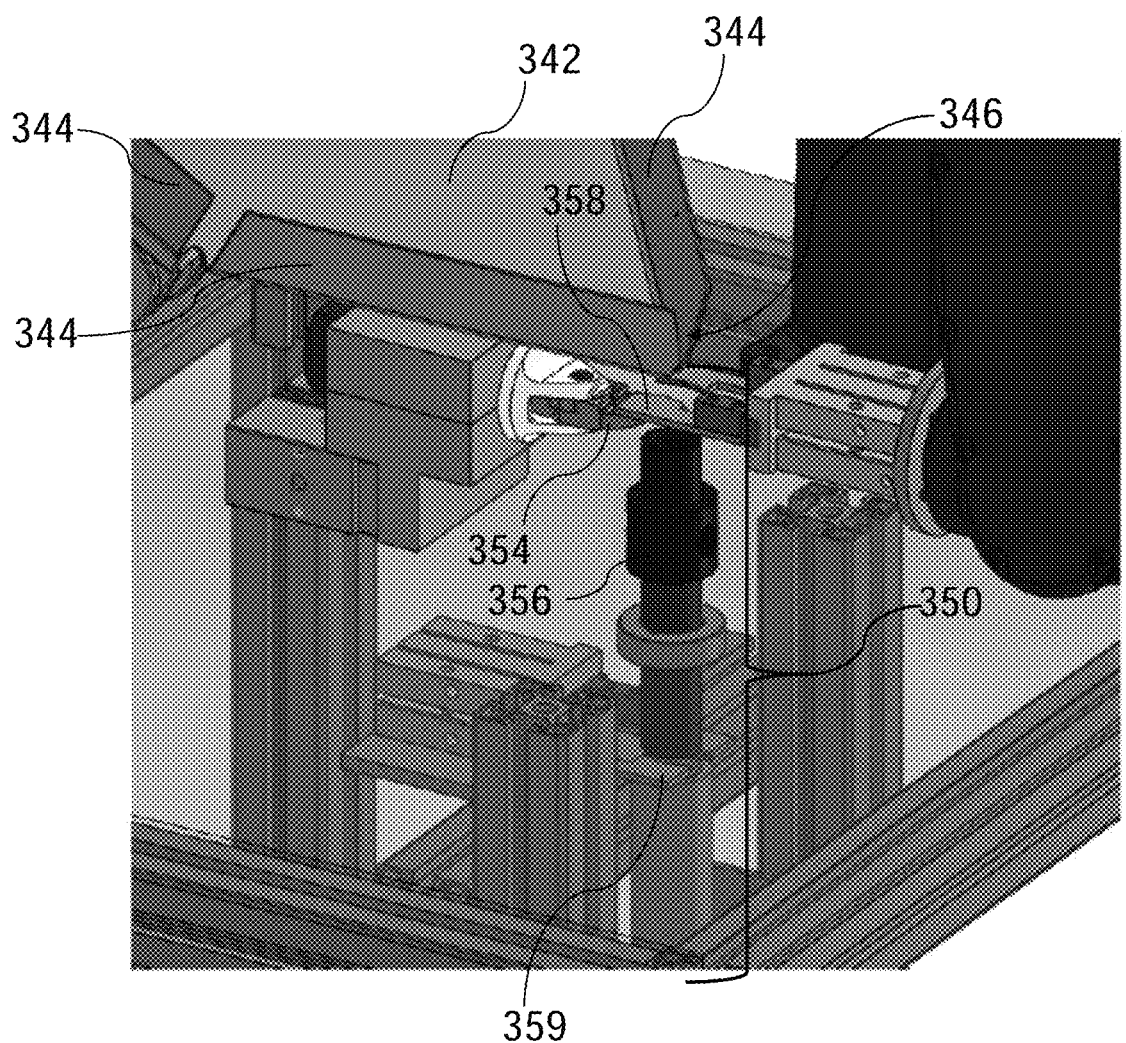
FIG. 14 is a perspective view of the exemplary sampling and tying machine of FIG. 10 showing exemplary components of the yarn sampling assembly of FIG. 12 in an open position.
Figure 15:
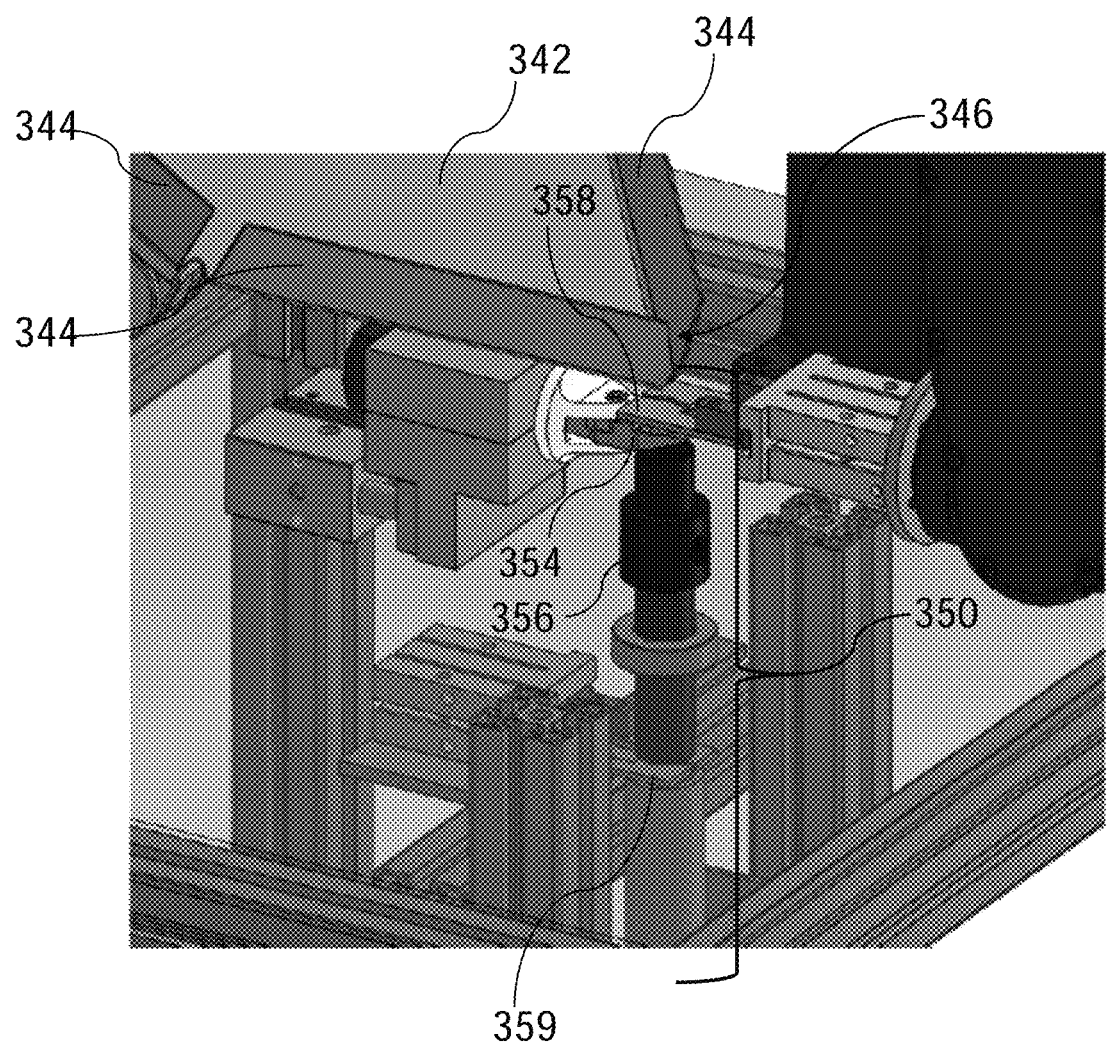
FIG. 15 is a perspective view of the exemplary components of the yarn sampling assembly of FIG. 14 in a closed position.

With reference to FIG. 14, the yarn sampling assembly 350 can comprise a yarn cutter 354. The yarn cutter 354 can be configured to cut a portion of the free end 25 of the yarn 23 for sampling. The yarn sampling assembly 350 can further comprise a vacuum 356 configured to draw the portion of free end 25 of the yarn 23 past the yarn cutter 354. In one aspect. the vacuum 356 can guide the free end 25 through the yarn sampling assembly 350 with air. The vacuum 356 may be controlled by the sensor. For example, the sensor can sense the free end 25 of the yarn 23 and signal to power the vacuum on until the sample is cut. The signal can be provided to a computing device as further disclosed herein. In one aspect, the vacuum 356 can be a Venturi vacuum. The yarn sampling assembly 350 can further comprise a first gripper 358 configured to hold the portion of the free end 25 of the yarn 23 as the yarn cutter 354 cuts the yarn 23. In one aspect, the yarn sampling assembly 350 can comprise a second gripper 359. Each gripper 358, 359 can comprise two opposing surfaces configured to be spaced apart when the gripper 358. 359 is open, as shown in FIG. 14, thereby allowing the portion of the free end 25 of the yarn 23 to extend between the two opposing surfaces of each gripper 358, 359. As shown in FIG. 15, the first gripper 358 and the second gripper 359 can be configured to close by moving the opposing surfaces of each gripper 358, 359 together so that the opposing surfaces abut. The grippers 358, 359 can pinch and secure the free end 25 of yarn 23 between the opposing surfaces when the grippers 358, 359 are closed.

With reference to FIG. 15, when the first gripper 358 or the first gripper 358 and second gripper 359 are closed and the portion of the free end 25 of yarn 23 is secured, the yarn cutter 354 may advance forward so that the yarn cutter 354 can cut the portion of the free end 25 of yarn 23. After the portion of the free end 25 of yarn 23 is cut, the cut portion may be collected in a collection bin for sampling. In one aspect. the collection bin may be proximate to the yarn sampling assembly 350 to allow the cut portion of yarn to fall into the collection bin. In one aspect, the yarn sampling assembly 350 can be configured to cut a yarn sample having a length from about 3 inches to about 32 inches. In one example, the yarn sampling assembly 350) can cut a yarn sample having a length of about 16 inches.

Figure 8:
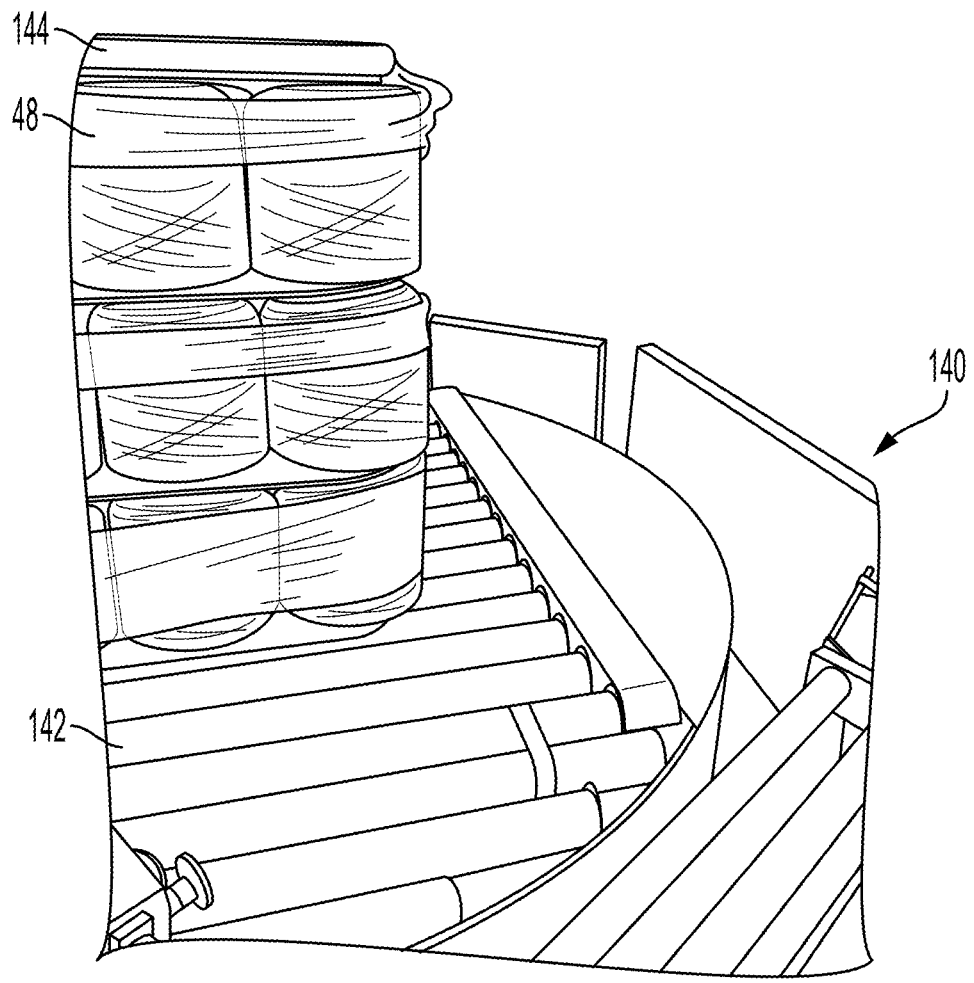
FIG. 8 illustrates an exemplary second wrapper as disclosed herein.

With reference to FIGS. 8-10, the sampling and tying machine 30 further comprises a yarn tying assembly 360. The yarn tying assembly 360 can be configured to tie the new or remaining free end 25 of yarn 23 around the yarn package 22 and in a knot to prevent unwinding of the yarn 23 from the yarn package 22. The yarn tying assembly 360 can comprise a multi-axis robotic arm 361. The multi-axis robotic arm 361 can comprise an end of arm tool 363 configured to grip the remaining portion of the free end 25 of the yarn 23 spooled on the yarn package 22. In one aspect, the end of arm tool 363 can be the first gripper 358 of the yarn sampling assembly 350, wherein the yarn 23 of the remaining portion of the free end 25 remains gripped by the first gripper 358. After the sample of yarn is cut, the first gripper 358, gripping the remaining free end 25 of yarn 23, can be used to tie the remaining free end 25 of yarn 23 around the yarn package 22.

Figure 16:
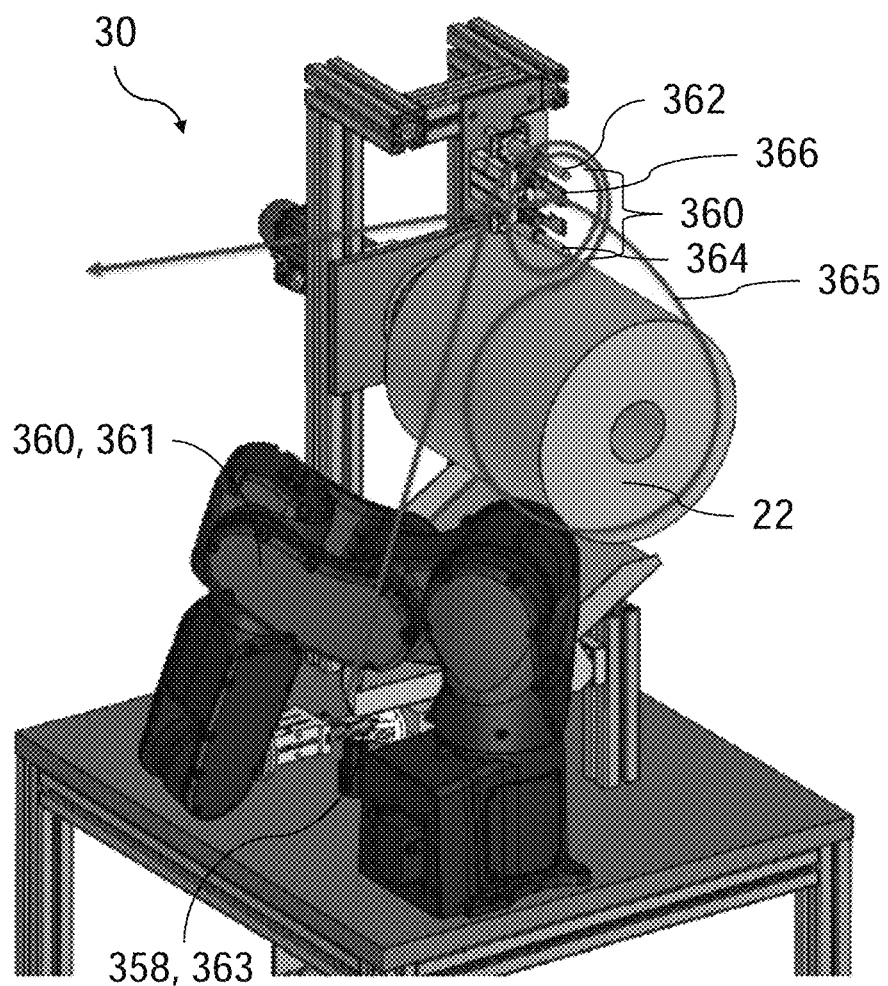
FIG. 16 is a perspective view of the exemplary sampling and tying machine of FIG. 10 showing an exemplary yarn tying assembly.
Figure 17:
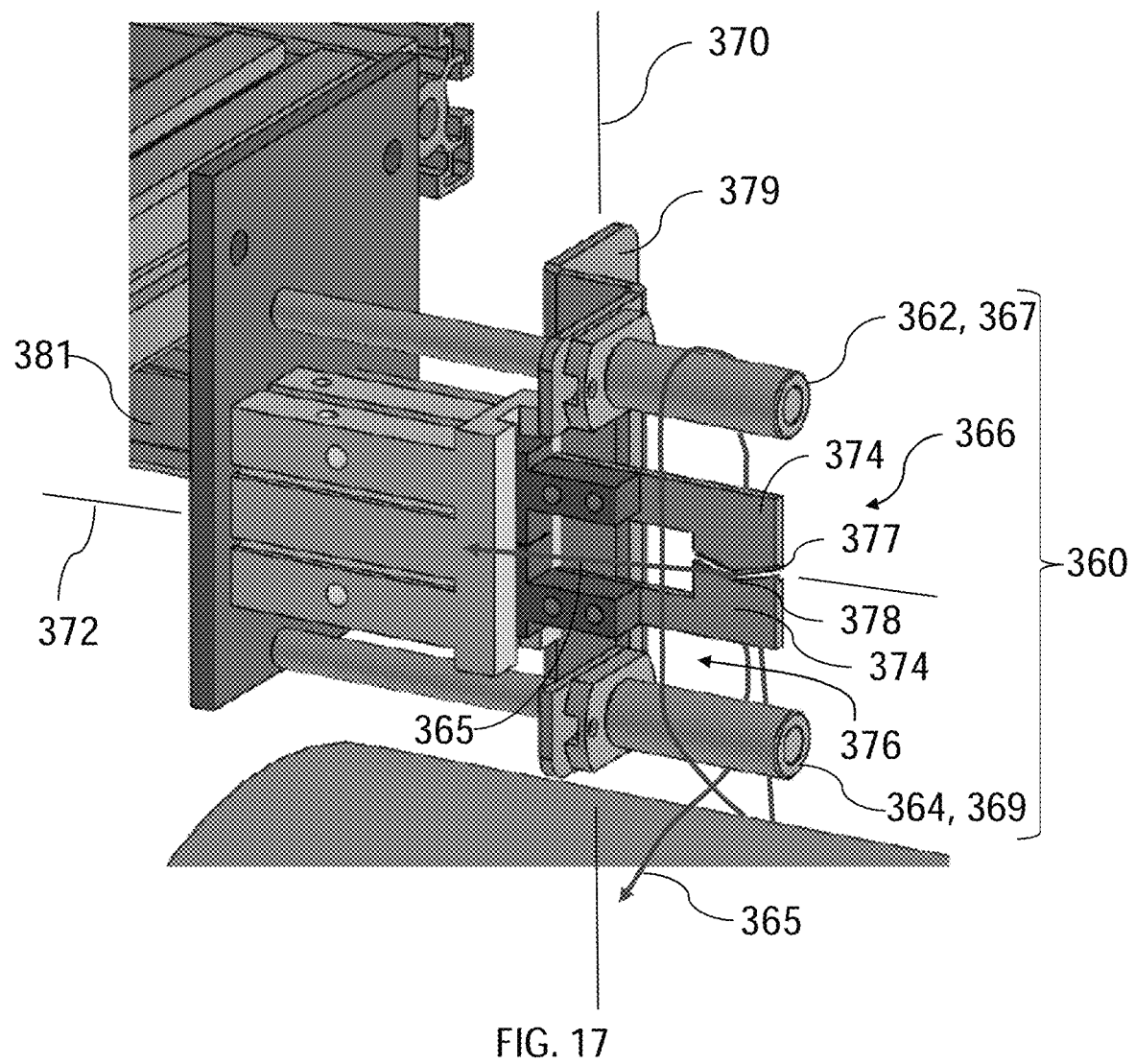
FIG. 17 is a perspective view of an exemplary first surface, second surface, and tying gripper of the yarn tying assembly of FIG. 16.

The yarn tying assembly 360 can further comprise a first surface 362 and a second surface 364. The first surface 362 and second surface 364 can be spaced along a first axis 370. In one aspect, the first surface 362 and the second surface 364 can comprise a first rod 367 and a second rod 369. Further, the first rod 367 and second rod 369 can extend along a second axis 372 which is substantially perpendicular to the first axis 370. The first surface 362 and second surface 364 can be configured to engage yarn 23 of the yarn package 22. For example, the end of arm tool 363, controlled and moved by the multi-axis robotic arm 361, can circle the first surface 362 and second surface 364 to loop the remaining free end 325 of yarn 323 around the first surface 362 and second surface 364. The path of the end of arm tool 363, and therefore, the remaining free end 25 of yarn 23 is illustrated by arrow 365 in FIG. 16 and FIG. 17. The looped yarn 23 around the first surface 362 and second surface 364 creates a through opening 376.

The yarn tying assembly 360 can further comprise a tying gripper 366. The tying gripper 366 can be positioned between the first surface 362 and the second surface 364 along the first axis 370. The tying gripper 366 can be configured to receive the remaining free end 25 of yarn 23. For example, the end of arm tool 363, controlled and moved by the multi-axis robotic arm 361, can circle the first surface 362 and second surface 364, wrap around the yarn package 22. and feed the remaining free end 25 of yarn 23 through the tying gripper 366 as shown by arrow 365 in FIG. 16 and FIG. 17. The tying gripper 366 can comprise opposed gripping surfaces 374 that can be configured to move toward and away from each other. When the opposed gripping surfaces 374 are away from each other or spaced apart, the remaining free end 25 of yarn 23 can pass between the opposed gripping surfaces 374. The opposed gripping surfaces 374 can then move towards each other to pinch or grip the remaining free end 25 of yarn 23. In one aspect, the opposed gripping surfaces 374 can include a protruding edge 377 and a recessed edge 378 that is complementary to the protruding edge 377. Further, the protruding edge 377 and the recessed edge 378 can have respective and complementary wedge shapes. When the wedge shapes come together when the tying gripper 366 closes, the protruding edge 377 and the recessed edge 378 can overlap with one another along the first axis 370. Further, the protruding edge 377 can comprise a protrusion, and the recessed edge 378 can comprise a slot configured to receive the protrusion when the tying gripper 366 closes. These exemplary configurations of the opposed gripping surfaces 374 ensure the remaining free end 25 of yarn 23 is secured by the closed tying gripper 366.

Figure 18:
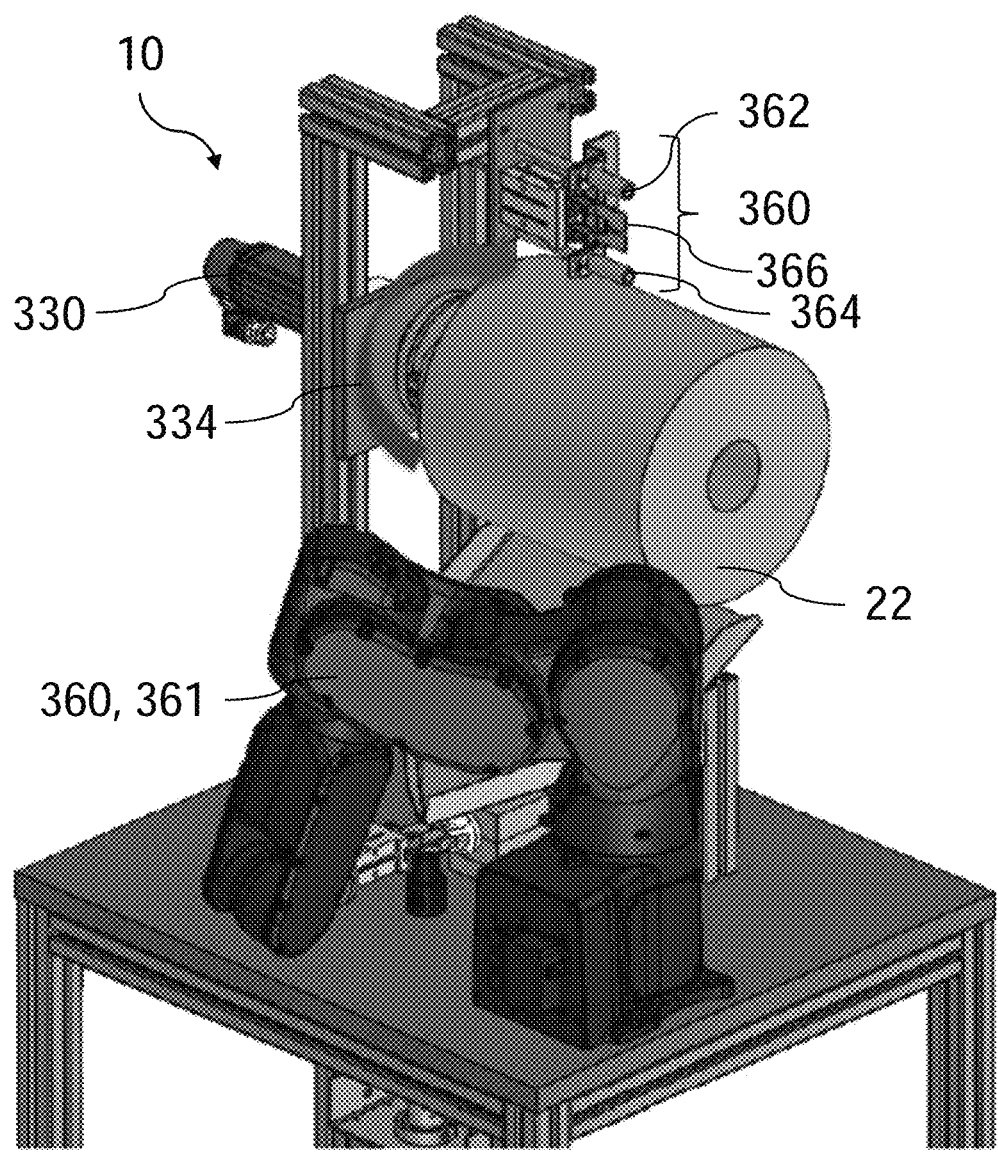
FIG. 18 is a perspective view of the exemplary sampling and tying machine of FIG. 10 showing rotation of an exemplary first actuator.

The yarn tying assembly 360 can comprise a second actuator. The second actuator can be configured to move the yarn 23 engaged on the first surface 362 and second surface 364, relative to the yarn 23 in the tying gripper 366 and along the second axis 372. In one aspect, the second actuator can comprise a pusher 381 configured to push the yarn 23 off the first rod 367 and the second rod 369. Further, the pusher 381 can push the yarn 23 off the first rod 367 and the second rod 369 by pushing a plate 379 configured to engage with the yarn 23. When the yarn 23 is pushed off the first surface 362 and second surface 364, the yarn 23 looped around the first surface 362 and second surface 364 is pushed past the tying gripper 366 securing the remaining free end 25 of yarn 23, and the remaining free end 25 of yarn 23 is pulled through the through opening 376 created by the looped yarn 23, thereby creating an overhand knot in the yarn 23. In one aspect, after the yarn 23 is pushed off the first surface 362 and second surface 364, the first actuator 330 can rotate the spindle, and therefore, the yarn package 22, in the second direction indicated by arrow 34 in FIG. 18, while the remaining free end 25 of yarn 23 remains gripped by the tying gripper 366. When the yarn package 22 is rotated in the second direction, the overhand knot created by the yarn tying assembly 360 is pulled tight. After the knot is pulled tight, the tying gripper 366 can open to release the remaining free end 25 of yarn 23, and the yarn package 22 may be unloaded from the sampling and tying machine 30 with the free end 25 of yarn 23 secured.

Method of Using Exemplary Sampling and Tying Machine

A method can comprise receiving a yarn package 22 including yarn 23 on a spindle. The yarn 23 can have a free end 25. The first actuator 30 coupled to the spindle can rotate the yarn package 22 to deliver the free end 25 to a yarn sampling assembly 350. The yarn sampling assembly 350 can remove a portion of the yarn 23 comprising the free end 25 to provide a yarn sample and to form a new or remaining free end 25 of the yarn 23 remaining on the spindle.

In some aspects, the yarn sampling assembly 350 can remove a portion of the yarn 23 comprising the free end 25 to provide the yarn sample and to form the new or remaining free end 25. Further, the portion of the yarn 23 can be removed by drawing, via a vacuum 356, a portion of the yarn 23 comprising the free end 25 past a yarn cutter 354; gripping the yarn 23 with a first gripper 358 in a first location: gripping, via an end of arm tool 363 of a multi-axis robotic arm 361, the free end 25 of the yarn 23 in a second location: and cutting the yarn 23 with the yarn cutter 354.

In some aspects, the multi-axis robotic arm 361 can move the yarn 23 to form a loop around a first surface 362 and a second surface 364 that are spaced apart along a first axis 370. The multi-axis robotic arm 361 can wrap the yarn 23 around the yarn package 22. The multi-axis robotic arm 361 can position the yarn 23 in a tying gripper 366 positioned between the first surface 362 and the second surface 364 along the first axis 370. The yarn 23 on the first surface 362 and the second surface 364 can be moved relative to the yarn 23 in the tying gripper 366 along a second axis 372 that is substantially perpendicular to the first axis 370 to form a knot. The first actuator 30 can rotate the spindle to tighten the knot.

Exemplary Aspects

In view of the described products, systems, and methods and variations thereof, herein below are described certain more particularly described aspects of the invention. These particularly recited aspects should not however be interpreted to have any limiting effect on any different claims containing different or more general teachings described herein, or that the "particular" aspects are somehow limited in some way other than the inherent meanings of the language literally used therein.

Aspect 1A: A system comprising:
at least one winder configured to wind yarn to form a yarn package;
at least one sampling and tying machine that is configured to remove a portion of the yarn of the yarn package and tie off a free end of the yarn around the yarn package to inhibit the yarn package from unwinding;
a dunnage supply area having therein at least one support structure for receiving a plurality of yarn packages thereon;
at least one case assembly area; and
a robotic arm configured to:
move the yarn package from the at least one winder to the at least one sampling and tying machine;
move the yarn package from the at least one sampling and tying machine to the at least one case assembly area; and
stack the yarn package on a support structure in the at least one case assembly area.

Aspect 2A: The system of aspect 1A, wherein each of the at least one winder, the at least one sampling and tying machine, the dunnage supply area, the at least one case assembly area, and the robotic arm is within a locked-out area.

Aspect 3A: The system of aspect 2A, further comprising a barrier that surrounds the locked-out area.

Aspect 4A: The system of any one of the preceding aspects, wherein the at least one support structure of the dunnage supply area comprises at least one pallet, at least one spacer, or a combination thereof.

Aspect 5A: The system of any one of the preceding aspects, wherein the robotic arm is further configured to move a support structure of the at least one support structure in the dunnage supply area to the at least one case assembly area.

Aspect 6A: The system of any one of the preceding aspects, wherein the at least one winder is a winder of a heat set apparatus.

Aspect 7A: The system of any one of the preceding aspects, further comprising at least one automated guided vehicle (AGV) that is configured to deliver the at least one support structure to the dunnage supply area.

Aspect 8A: The system of aspect 7A, wherein the at least one AGV is further configured to carry a case from the least one case assembly area, wherein the case comprises at least one support structure and a plurality of yarn packages thereon.

Aspect 9A: The system of any one of the preceding aspects, wherein the robotic arm is configured to form a case comprising at least one pallet, a plurality of packages stacked on the pallet, at least one spacer stacked on the plurality of packages stacked on the pallet, and a plurality of packages stacked on the spacer.

Aspect 10A: The system of aspect 9A, wherein the case comprises four layers of yarn packages and three spacers, wherein each of the three spacers is positioned between respective layers of yarn packages.

Aspect 11A: The system of any one of the preceding aspects, further comprising a staging rack that is configured to store at least one support structure from the dunnage supply area.

Aspect 12A: The system of any one of the preceding aspects, wherein the at least one winder comprises two winders.

Aspect 13A: The system of any one of the preceding aspects, wherein the at least one sampling and tying machine comprises two sampling and tying machines.

Aspect 14A: The system of any one of the preceding aspects, further comprising a first conveyor that is configured to carry a case from the at least one case assembly area.

Aspect 15A: The system of aspect 14, further comprising a second conveyor that is configured to receive the case from the first conveyor.

Aspect 16A: The system of any one of the preceding aspects, further comprising a vertical wrapper that is configure to move a roll of wrapping material about a periphery of a case comprising at least one support structure and a plurality of yarn packages thereon.

Aspect 17A: The system of any one of the preceding aspects, further comprising a horizontal wrapper that is configured to rotate the case to apply wrapping material to a periphery of a case comprising at least one support structure and a plurality of yarn packages thereon.

Aspect 18A: A method of using the system as in any one of the preceding aspects, the method comprising:
  winding, by the winder, yarn to form a yarn package;
  moving, by the robotic arm, the yarn package from the winder to the at least one sampling and tying machine;
  moving, by the robotic arm, the yarn package from the at least one sampling and tying machine to a first case assembly area of the at least one case assembly area; and
  stacking, by the robotic arm, the yarn package on a support structure in the first case assembly area.

Aspect 19A: The method of aspect 18A, wherein stacking, by the robotic arm, the yarn package on the support structure in the at least one case assembly area comprises:
  stacking a first layer of yarn packages on a pallet;
  placing a spacer on the first layer of yarn packages; and
  stacking a second layer of yarn packages on the spacer.

Aspect 20A: The method of aspect 19A, wherein the pallet and the spacer each comprise a cardboard sheet.

Aspect 21A: A method comprising:
  winding, by a winder, yarn to form a yarn package;
  moving, by a robotic arm, the yarn package from the winder to at least one sampling and tying machine;
  moving, by the robotic arm, the yarn package from the at least one sampling and tying machine to a case assembly area; and
  stacking, by the robotic arm, the yarn package on a support structure in the case assembly area.

Aspect 22A: The method of aspect 21A, wherein stacking, by the robotic arm, the yarn package on the support structure in the case assembly area comprises:
  stacking a first layer of yarn packages on a pallet;
  placing a spacer on the first layer of yarn packages; and
  stacking a second layer of yarn packages on the spacer.

Aspect 23A: The method of aspect 21A or aspect 22A, further comprising moving, by the robotic arm, a support structure from a staging rack to the case assembly area.

Aspect 24A: The method of aspect 23A, further comprising moving, by the robotic arm, a support structure from a dunnage supply area to the staging rack.

Aspect 25A: The method of aspect 21A, wherein the method is performed within a locked-out area.

Aspect 1B: A system for sampling and tying yarn of a package having a free end, the system comprising:
  a spindle;
  a first actuator that is configured to rotate the spindle in a first direction and an opposed second direction;
  a yarn sampling assembly configured to receive a portion of the yarn comprising the free end; and
  a yarn tying assembly configured to tie a knot in the yarn of the package to prevent unwinding of the yarn from the package.

Aspect 2B: The system of aspect 1B, wherein the yarn sampling assembly comprises:
  a yarn cutter;
  a vacuum that is configured to draw the portion of the yarn comprising the free end past the yarn cutter; and
  a first gripper that is configured to hold the portion of the yarn comprising the free end as the yarn cutter cuts the yarn.

Aspect 3B: The system of aspect 2B, wherein the yarn sampling assembly further comprises a sensor that is configured to detect the yarn being positioned at the yarn sampling assembly.

Aspect 4B: The system of any one of aspects 1B-3B, further comprising a guide that is configured to direct the free end of the package to the yarn sampling assembly.

Aspect 5B: The system of aspect 4B, wherein the guide comprises:
  a base surface; and
  a pair of walls on opposed sides of the base surface, wherein the walls converge toward an opening between the walls, wherein the opening is positioned proximate to the yarn sampling assembly.

Aspect 6B: The system of any one of aspects 1B-5B, wherein the yarn tying assembly comprises:
  a multi-axis robotic arm comprising an end of arm tool that is configured to grip the yarn of the yarn package;
  first and second surfaces that are spaced along a first axis and each configured to engage yarn of the yarn package;
  a tying gripper positioned between the first and second surfaces along the first axis and configured to receive yarn of the yarn package, wherein the tying gripper comprises opposed gripping surfaces that are configured to move toward and away from each other; and
  a second actuator that is configured to move the yarn on the first and second surfaces relative to the yarn in the tying gripper along a second axis that is perpendicular to the first axis.

Aspect 7B: The system of aspect 6B, wherein the first and second surfaces that are spaced along the first axis comprise first and second rods that extend along the second axis, wherein the second actuator comprises a pusher that is configured to push the yarn off the first and second rods.

Aspect 8B: The system of aspect 6B or aspect 7B, wherein the opposed gripping surfaces of the tying gripper comprise a protruding edge and an opposed recessed edge that is complementary to the protruding edge.

Aspect 9B: The system of aspect 8B, wherein the protruding edge and the recessed edge have respective wedge shapes that are complementary to one another, and wherein in a closed configuration, the protruding edge and the recessed edge overlap with one another along the first axis.

Aspect 10B: The system of aspect 9B, wherein the protruding edge and the recessed edge each have respective ends that are spaced apart along the second axis, wherein at least one of the ends of the protruding edge defines a protrusion, and wherein at least one of the ends of the recessed edge defines a slot that, in the closed configuration, is configured to receive the protrusion of a corresponding end of the protruding edge.

Aspect 11B: The system of any one of aspects 6B-10B, wherein the yarn sampling assembly comprises:
a yarn cutter;
a vacuum that is configured to draw the portion of the yarn comprising the free end past the yarn cutter; and
a first gripper that is configured to hold the portion of the yarn comprising the free end as the yarn cutter cuts the yarn,
wherein the system further comprises a controller, wherein the controller is configured to:
cause the first actuator to rotate the spindle in the first direction to release yarn from the package,
cause the vacuum of the yarn sampling assembly to draw the portion of the yarn comprising the free end past the yarn cutter,
cause the first gripper of the yarn sampling assembly to grip the yarn in a first location,
cause the end of arm tool of the robotic arm of the yarn tying assembly to grip the yarn in a second location, and
cause the yarn cutter of the yarn sampling assembly to cut the yarn.

Aspect 12B: The system of aspect 11B, wherein the controller is further configured to:
cause the robotic arm of the yarn tying assembly to move the yarn to form a loop around the first and second surfaces, wrap around the yarn package, and then position the yarn in the tying gripper;
cause the second actuator of the yarn tying assembly to move the yarn on the first and second surfaces relative to the yarn in the tying gripper along the second axis to form a knot; and
cause the first actuator to rotate the spindle to tighten the knot.

Aspect 13B: The system of any one of aspects 1B-12B, wherein the yarn sampling assembly is configured to cut a yarn sample having a length from about 3 inches to about 32inches.

Aspect 14B: A method comprising:
receiving a package comprising yarn on a spindle, the yarn having a free end;
rotating, by a first actuator coupled to the spindle, the package to deliver the free end to a sampling assembly; and
removing, by the sampling assembly, a portion of the yarn comprising the free end to provide a yarn sample and to form a new free end of the yarn remaining on the spindle.

Aspect 15B: The method of aspect 14B, wherein removing, by the sampling assembly, a portion of the yarn comprising the free end to provide the yarn sample and to form the new free end comprises:
drawing, by a vacuum, a portion of the yarn comprising the free end past a yarn cutter;
gripping the yarn with a first gripper in a first location;
gripping, by an end of arm tool of a multi-axis robotic arm, the free end of the yarn in a second location; and
cutting the yarn with the yarn cutter.

Aspect 16B: The method of aspect 15B, further comprising:
moving, by the robotic arm, the yarn to form a loop around first and second surfaces that are spaced apart along a first axis;
wrapping, by the robotic arm, the yarn around the yarn package;
positioning, by the robotic arm, the yarn in a tying gripper positioned between the first and second surfaces along the first axis;
moving the yarn on the first and second surfaces relative to the yarn in the tying gripper along a second axis that is perpendicular to the first axis to form a knot; and
rotating, by the first actuator, the spindle to tighten the knot.

Aspect 1C: The system of any one of aspects 1A-17A, wherein the sampling and tying machine comprises or is defined by at least a portion of the system of any one of aspects 1B-13B.

Aspect 1D: The system of any one of aspects 1A-17A, wherein the sampling and tying machine comprises:
a spindle;
a first actuator that is configured to rotate the spindle in a first direction and an opposed second direction;
a yarn sampling assembly configured to receive a portion of the yarn comprising a free end; and
a yarn tying assembly configured to tie a knot in the yarn of the yarn package to prevent unwinding of the yarn from the yarn package.

Although the foregoing invention has been described in some detail by way of illustration and example for purposes of clarity of understanding, certain changes and modifications may be practiced within the scope of the appended claims.

What is claimed is:

1. A system comprising:
at least one winder configured to wind yarn to form a yarn package;
at least one sampling and tying machine that is configured to remove a portion of the yarn of the yarn package and tie off a free end of the yarn around the yarn package to inhibit the yarn package from unwinding;
a dunnage supply area having therein at least one support structure for receiving a plurality of yarn packages thereon;
at least one case assembly area; and
a robotic arm configured to:
move the yarn package from the at least one winder to the at least one sampling and tying machine;
move the yarn package from the at least one sampling and tying machine to the at least one case assembly area; and stack the yarn package on a support structure in the at least one case assembly area,
wherein each of the at least one winder, the at least one sampling and tying machine. the dunnage supply area, the at least one case assembly area, and the robotic arm is within a locked-out area.

2. The system of claim 1, further comprising a barrier that surrounds the locked-out area.

3. The system of claim 1, wherein the at least one support structure of the dunnage supply area comprises at least one pallet, at least one spacer, or a combination thereof.

4. The system of claim 1, wherein the robotic arm is further configured to move a support structure of the at least one support structure in the dunnage supply area to the at least one case assembly area.

5. The system of claim 1, wherein the at least one winder is a winder of a heat set apparatus.

6. The system of claim 1, further comprising at least one automated guided vehicle (AGV) that is configured to deliver the at least one support structure to the dunnage supply area.

7. The system of claim 6, wherein the at least one AGV is further configured to carry a case from the least one case assembly area, wherein the case comprises at least one support structure and a plurality of yarn packages thereon.

8. The system of claim 1, wherein the robotic arm is configured to form a case comprising at least one pallet, a plurality of packages stacked on the pallet, at least one spacer stacked on the plurality of packages stacked on the pallet, and a plurality of packages stacked on the spacer.

9. The system of claim 8, wherein the case comprises four layers of yarn packages and three spacers, wherein each of the three spacers is positioned between respective layers of yarn packages.

10. The system of claim 1, further comprising a staging rack that is configured to store at least one support structure from the dunnage supply area.

11. The system of claim 1, wherein the at least one winder comprises two winders.

12. A system comprising:
at least one winder configured to wind yarn to form a yarn package;
at least one sampling and tying machine that is configured to remove a portion of the yarn of the yarn package and tie off a free end of the yarn around the yarn package to inhibit the yarn package from unwinding;
a dunnage supply area having therein at least one support structure for receiving a plurality of yarn packages thereon;
at least one case assembly area; and
a robotic arm configured to:
move the yarn package from the at least one winder to the at least one sampling and tying machine;
move the yarn package from the at least one sampling and tying machine to the at least one case assembly area; and
stack the yarn package on a support structure in the at least one case assembly area,
wherein the at least one sampling and tying machine comprises two sampling and tying machines.

13. A system comprising:
at least one winder configured to wind yarn to form a yarn package;
at least one sampling and tying machine that is configured to remove a portion of the yarn of the yarn package and tie off a free end of the yarn around the yarn package to inhibit the yarn package from unwinding;
a dunnage supply area having therein at least one support structure for receiving a plurality of yarn packages thereon;
at least one case assembly area;
a robotic arm configured to:
move the yarn package from the at least one winder to the at least one sampling and tying machine;
move the yarn package from the at least one sampling and tying machine to the at least one case assembly area; and
stack the yarn package on a support structure in the at least one case assembly area; and
a first conveyor that is configured to carry a case from the at least one case assembly area.

14. The system of claim 13, further comprising a second conveyor that is configured to receive the case from the first conveyor.

15. A system comprising:
at least one winder configured to wind yarn to form a yarn package;
at least one sampling and tying machine that is configured to remove a portion of the yarn of the yarn package and tie off a free end of the yarn around the yarn package to inhibit the yarn package from unwinding;
a dunnage supply area having therein at least one support structure for receiving a plurality of yarn packages thereon;
at least one case assembly area;
a robotic arm configured to:
move the yarn package from the at least one winder to the at least one sampling and tying machine;
move the yarn package from the at least one sampling and tying machine to the at least one case assembly area; and
stack the yarn package on a support structure in the at least one case assembly area; and
a vertical wrapper that is configured to move a roll of wrapping material about a periphery of a case comprising at least one support structure and a plurality of yarn packages thereon.

16. A system comprising:
at least one winder configured to wind yarn to form a yarn package;
at least one sampling and tying machine that is configured to remove a portion of the yarn of the yarn package and tie off a free end of the yarn around the yarn package to inhibit the yarn package from unwinding;
a dunnage supply area having therein at least one support structure for receiving a plurality of yarn packages thereon;
at least one case assembly area;
a robotic arm configured to:
move the yarn package from the at least one winder to the at least one sampling and tying machine;
move the yarn package from the at least one sampling and tying machine to the at least one case assembly area; and
stack the yarn package on a support structure in the at least one case assembly area; and
a horizontal wrapper that is configured to rotate the case to apply wrapping material to a periphery of a case comprising at least one support structure and a plurality of yarn packages thereon.

17. A method of using the system as in claim 1, the method comprising:
winding, by the winder, yarn to form a yarn package;

moving, by the robotic arm, the yarn package from the winder to the at least one sampling and tying machine;

moving, by the robotic arm, the yarn package from the at least one sampling and tying machine to a first case assembly area of the at least one case assembly area; and stacking, by the robotic arm, the yarn package on a support structure in the first case assembly area.

18. The method of claim 17, wherein stacking, by the robotic arm, the yarn package on the support structure in the at least one case assembly area comprises:

stacking a first layer of yarn packages on a pallet;

placing a spacer on the first layer of yarn packages; and stacking a second layer of yarn packages on the spacer.

19. The method of claim 18, wherein the pallet and the spacer each comprise a cardboard sheet.

20. A method comprising:

winding, by a winder, yarn to form a yarn package;

moving, by a robotic arm, the yarn package from the winder to at least one sampling and tying machine;

moving, by the robotic arm, the yarn package from the at least one sampling and tying machine to a case assembly area; and stacking, by the robotic arm, the yarn package on a support structure in the case assembly area, wherein the method is performed within a locked-out area.

21. The method of claim 20, wherein stacking, by the robotic arm, the yarn package on the support structure in the case assembly area comprises:

stacking a first layer of yarn packages on a pallet;

placing a spacer on the first layer of yarn packages; and stacking a second layer of yarn packages on the spacer.

22. The method of claim 20, further comprising moving, by the robotic arm, a support structure from a staging rack to the case assembly area.

23. The method of claim 22, further comprising moving, by the robotic arm, a support structure from a dunnage supply area to the staging rack.

\* \* \* \* \*